US009210607B2

(12) United States Patent
Huang et al.

(10) Patent No.: US 9,210,607 B2
(45) Date of Patent: Dec. 8, 2015

(54) METHOD FOR GROUPING MTC DEVICES IN MTC NETWORKS AND COMMUNICATION METHOD

(71) Applicant: Industrial Technology Research Institute, Hsinchu (TW)

(72) Inventors: Jane-Hwa Huang, Tainan (TW); Li-Chun Wang, Hsinchu (TW); Ang-Hsun Tsai, Taichung (TW); Tzu-Ming Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/719,244

(22) Filed: Dec. 19, 2012

(65) Prior Publication Data

US 2013/0157653 A1    Jun. 20, 2013

Related U.S. Application Data

(60) Provisional application No. 61/577,098, filed on Dec. 19, 2011.

(51) Int. Cl.
*H04W 24/00* (2009.01)
*H04W 4/00* (2009.01)
(Continued)

(52) U.S. Cl.
CPC ............ *H04W 28/0215* (2013.01); *H04W 4/00* (2013.01); *H04W 4/005* (2013.01); *H04W 4/08* (2013.01); *H04W 28/02* (2013.01); *H04W 28/06* (2013.01)

(58) Field of Classification Search
CPC . H04W 4/005; H04W 48/06; H04W 28/0215; H04W 48/02; H04W 28/0289; H04W 72/0486; H04W 28/0284; H04W 28/08
USPC .............................................. 455/423, 452.1
See application file for complete search history.

(56) References Cited

U.S. PATENT DOCUMENTS

| 7,191,246 B2 | 3/2007 | Deshpande |
| 2010/0090829 A1 | 4/2010 | Pujol |

(Continued)

FOREIGN PATENT DOCUMENTS

| CN | 101009537 | 8/2007 |
| CN | 102014343 | 4/2011 |

(Continued)

OTHER PUBLICATIONS

Wang et al., "An Adaptive Medium Access Control Mechanism for Cellular Based Machine to Machine (M2M) Communication," 2010 IEEE International Conference on Wireless Information Technology and Systems (ICWITS), Aug. 28-Sep. 3, 2010, pp. 1-4.
Jung et al, "Machine-Type-Communication (MTC) Device Grouping Algorithm for Congestion Avoidance of MTC Oriented LTE Network," First International Conference on Communications in Computer and Information Science 78, Sep. 15-17, 2010, pp. 167-178.

(Continued)

*Primary Examiner* — Timothy Pham
(74) *Attorney, Agent, or Firm* — Jianq Chyun IP Office

(57) ABSTRACT

Methods for grouping MTC devices in MTC networks are proposed. One of the proposed methods includes grouping femto MTC devices into femto groups and grouping macro MTC devices into macro groups, where each of the assigned groups has its granted interval for delivering MTC messages. In the proposed method, it may detect network overload of each group or unsuccessful access request of each device, and statistically count consecutively accumulated number of occurrence of the CN overload of each group or accumulated number of occurrence of unsuccessful access request retries of each device. The group numbers, cycle time, and access probability of the macro groups or the femto groups may be adjusted according to the aforementioned accumulated numbers. In addition, the macro groups or the femto groups are merged or split according to determination based on the statistical counts.

33 Claims, 19 Drawing Sheets

(51) Int. Cl.
*H04W 28/02* (2009.01)
*H04W 4/08* (2009.01)
*H04W 72/00* (2009.01)
*H04W 28/06* (2009.01)

(56) References Cited

U.S. PATENT DOCUMENTS

| | | |
|---|---|---|
| 2010/0238885 A1 | 9/2010 | Borran et al. |
| 2011/0035584 A1 | 2/2011 | Meyerstein et al. |
| 2011/0128911 A1 | 6/2011 | Shaheen |
| 2011/0134841 A1 | 6/2011 | Shaheen |
| 2011/0151859 A1 | 6/2011 | Lee et al. |
| 2011/0199901 A1 | 8/2011 | Kavanaugh et al. |
| 2011/0199905 A1 | 8/2011 | Pinheiro et al. |
| 2011/0201344 A1 | 8/2011 | Ryu et al. |
| 2012/0082052 A1* | 4/2012 | Oteri et al. ............ 370/252 |
| 2012/0108255 A1* | 5/2012 | Jo et al. ............ 455/450 |
| 2013/0136072 A1* | 5/2013 | Bachmann et al. ............ 370/329 |
| 2013/0265984 A1* | 10/2013 | Li et al. ............ 370/330 |
| 2014/0010140 A1* | 1/2014 | Martinez Tarradell et al. ............ 370/312 |

FOREIGN PATENT DOCUMENTS

| | | |
|---|---|---|
| TW | 201029399 | 8/2010 |
| WO | 2011088901 | 7/2011 |
| WO | 2011123755 | 10/2011 |
| WO | 2011127710 | 10/2011 |

OTHER PUBLICATIONS

Niyato et al, "Machine-to-Machine Communications for Home Energy Management System in Smart Grid," IEEE Communications Magazine 49 (4), Apr. 2011, pp. 1-18.

Lien et al, "Massive Access Management for QoS Guarantees in 3GPP Machine-to-Machine Communications," IEEE Communications Letters 15 (3), Mar. 2011, pp. 311-313.

Lien et al., "Toward Ubiquitous Massive Accesses in 3GPP Machine-to-Machine Communications," IEEE Communications Magazine 49 (4), Apr. 2011, pp. 66-74.

3GPP Organizational Partners, "3rd Generation Partnership Project; Technical Specification Group Radio Access Network; Radio Resource Control (RRC); Protocol specification (Release 10)," 3GPP TS 25.331 V10.5.0, Sep. 2011, pp. 1-1882.

Holma et al., "LTE for UMTS: OFDMA and SC-FDMA Based Radio Access," John Wiley & Sons, Ltd., Jun. 2, 2009, pp. 146-155.

3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10. 3.0, Sep. 2011, pp. 1-296.

3GPP Organizational Partners, "3rd Generation Partnership Project; Technical Specification Group Radio Access Network; Study on Ran Improvements for Machine-type Communications (Release 10)", 3GPP TR 37.868 V0.6.3, Oct. 2010, pp. 1-25.

Sheu et al., "Load Analysis for MTC Devices in Idle Mode or Detached State," International Computer Symposium (ICS), Dec. 16-18, 2010, pp. 424-428.

"Office Action of Taiwan Counterpart Application", issued on Jan. 12, 2015, p. 1-p. 15.

\* cited by examiner

METHOD FOR GROUPING MTC DEVICES IN MTC NETWORKS AND COMMUNICATION METHOD

CROSS-REFERENCE TO RELATED APPLICATION

This application claims the priority benefit of U.S. provisional application Ser. No. 61/577,098, filed on Dec. 19, 2011. The entirety of the above-mentioned patent application is hereby incorporated by reference herein and made a part of this specification.

BACKGROUND

1. Technical Field

The disclosure generally relates to a method for grouping Machine-type-communication (MTC) devices in MTC networks.

2. Related Art

Machine-type-communication (abbreviated as MTC) or Machine to Machine communications (M2M) can enable information exchange between a subscriber station (or a wireless communication device) and a server in the core network (through a base station) or just between subscriber stations, which may be carried out without any human interaction. MTC would have huge market potential. However, when numerous MTC devices are concurrently transmitting/delivering messages to wireless communication networks, it may easily result in radio access network (RAN) congestion/overload, and further result in core network (CN) congestion/overload. For example, in a 3GPP LTE network, CN congestion/overload may occur at mobility management entity (MME), femtocell gateway, serving general packet radio service support node (Serving GPRS support node, abbreviated as SGSN), Gateway GPRS support node (GGSN), MTC gateway (MTC GW), or MTC server. CN congestion/overload may further cause unacceptable delay of messages or packet loss of all services within the wireless communication networks.

Though conventional art proposes several approaches to mitigate the RAN overload or the CN overload, such as call admission control approaches, active paging-based grouping and time control approaches, access probability adaptation approaches or access class barring (ACB) schemes, there is no effective approach which could mitigate both the RAN overload and the CN overload at the same time.

On the other hand, heterogeneous MTC network, which consists of macro cell MTC devices and femto cell MTC devices, could be applied to mitigate the RAN overload. For example, MTC devices within houses or buildings could be served by femto cell base stations (the femto cell stations are connected to the MTC server through other Internet connections rather than through conventional RAN) while outdoors MTC devices are served by macro cell base stations. Although femto cell MTC devices consume less power and femto cell base stations offload MTC message traffic from macro cell base stations, the CN overload is not mitigated properly and may become worse since there might be more MTC devices connected to the MTC servers through the femtocell base stations. Therefore, it is a major concern in the wireless communication industry to develop an effective access scheme for heterogeneous MTC network.

SUMMARY

A method for grouping machine type communication (MTC) devices is introduced herein. According to an exemplary embodiment, the method includes the steps of grouping MTC devices by a control node into macro groups and femto groups, wherein the MTC devices served by one or more macro cell base stations are grouped into macro groups, and the MTC devices served by one or more femto cell base stations are grouped into femto groups.

A method for grouping MTC devices in heterogeneous MTC networks is introduced herein and includes the steps of grouping MTC devices by a control node into macro groups and femto groups, wherein MTC devices served by at least one macro cell base station are grouped into macro groups and transmit MTC data to the MTC server in each assigned macro granted interval, and MTC devices served by at least one femto cell base station are grouped into femto groups and transmit MTC data to the MTC server in each assigned femto granted interval.

A communication method, adapted to a machine type communication (MTC) device in a heterogeneous network having a plurality of MTC devices, wherein MTC devices served by at least one macro cell base station are grouped into macro groups, MTC devices served by at least one femto cell base station are grouped into femto groups; macro MTC devices in each macro group transmit data to the MTC server in an assigned macro granted interval, and femto MTC devices in each femto group transmit data to the MTC server in an assigned femto granted interval is introduced herein, and the method contains the steps of detecting network overload by a control node to generate a detection result; and reforming the grouping and adjusting an access probability of the MTC device by the control node according to the detection result.

A communication method, adapted to a machine type communication (MTC) device in a heterogeneous MTC network comprising a plurality of MTC devices, wherein MTC devices served by at least one macro cell base station is grouped into macro groups, and MTC devices served by at least one femto cell base station is grouped into femto groups, wherein MTC devices in each macro group transmit MTC data to the MTC server in an assigned macro granted interval, and MTC devices in each femto group transmit MTC data to the MTC server in an assigned femto granted interval is introduced herein, and the method includes the steps of receiving by the MTC device a system information containing a group rearrangement command; and adjusting its own group assignment by the MTC device according to the group rearrangement command.

A communication method adapted to a machine type communication (MTC) device in a heterogeneous MTC network comprising a plurality of MTC devices, wherein MTC devices served by at least one macro cell base station is grouped into macro groups, and MTC devices served by at least one femto cell base station is grouped into femto groups, wherein MTC devices in each macro group transmit MTC data to the MTC server in an assigned macro granted interval, and MTC devices in each femto group transmit MTC data to the MTC server in an assigned femto granted interval is introduced herein, and the method includes the steps of receiving by the MTC device a connection reconfiguration message containing a group rearrangement command; and adjusting its own group assignment by the MTC device according to the group rearrangement command.

A method for grouping machine type communication (MTC) devices in a network is introduced herein, and the method includes the steps of grouping MTC devices by a control node into a MTC group according to a base station type which serves the MTC device; and transmitting an indication by the control node to the base station for adjusting radio communication of the network.

A method for grouping machine type communication (MTC) devices in heterogeneous MTC networks is introduced herein, and the method includes the steps of grouping MTC devices by a control node into macro groups and femto groups, wherein MTC devices served by at least one macro cell base station are grouped into a macro group, and MTC devices served by at least one femto cell base station are grouped into a femto group; detecting network overlord to generate a message by an MTC device after sending MTC data; transmitting the message by the MTC device to a control node; and receiving from the control node a group rearrangement command or an access probability adjustment command by the MTC devices.

A communication method, adapted to a machine type communication (MTC) device in a heterogeneous network having a plurality of MTC devices, wherein MTC devices served by at least one macro cell base station are grouped into macro groups, MTC devices served by at least one femto cell base station are grouped into femto groups; macro MTC devices in each macro group transmit data to the MTC server in an assigned macro granted interval, and femto MTC devices in each femto group transmit data to the MTC server in an assigned femto granted interval is introduced herein, and the method contains the steps of detecting by a MTC device whether an MTC message transmitted from an MTC device to an MTC server is unsuccessful to generate a detection result; and adjusting an access probability of the MTC device by the MTC device according to the detection result.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

Figure 1:
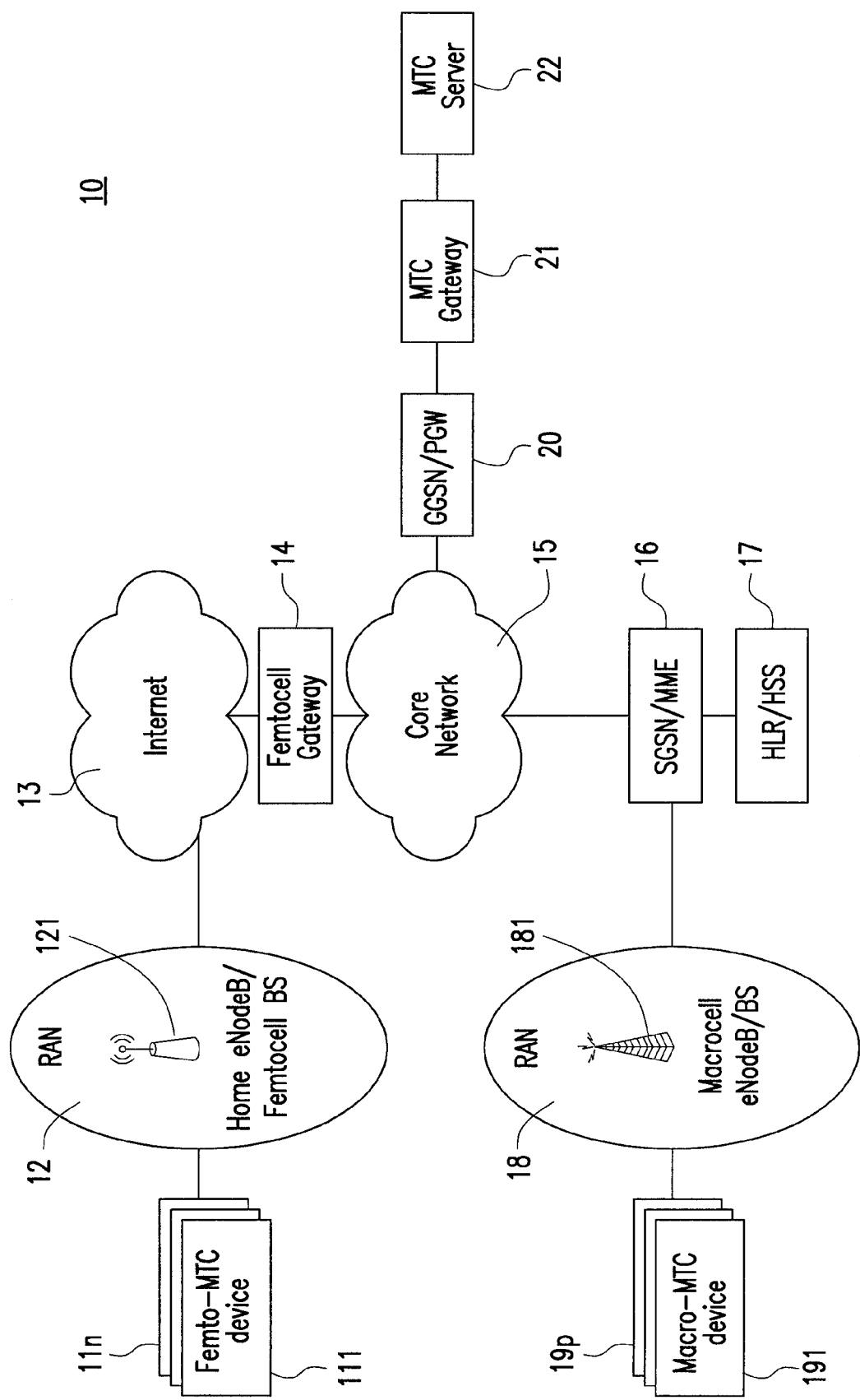
FIG. 1 illustrates a system architecture of a heterogeneous MTC network.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

According to theoretical analysis and simulation, it is shown that RAN overload probability is mainly dominated by MTC message arrival rate and macro group size (the number of macro MTC devices in a macro group). The simulation is carried out in a heterogeneous MTC network, which consist of macro cell MTC devices and femto cell MTC devices. There are 19 macrocells considered in the simulation, and there are 30,000 MTC devices in a macrocell, where 30,000 MTC devices include 5,000 outdoor MTC devices served by a macrocell and 25,000 indoor MTC devices which are served by 5,000 femtocells (in houses or in buildings). It is also assumed that the number of maximum supportable connections for a macrocell base station is 800. The number of maximum supportable connections for the core network in the heterogeneous MTC network is totally 15,200 for all 19 macrocells. It is further assumed that merely 25% network resource is used for MTC connections. The capacity threshold for MTC communications in radio access network is $Th_{RAN}=200$, and the capacity threshold for MTC communications in core network is $Th_{CN}=3,800$.

Under the aforementioned assumption, it is also shown that CN overload probability is mainly dominated by MTC message arrival rate, macro group size, and femto group size (the number of femtocells/femto MTC devices in a femto group). Specifically, as MTC traffic load/MTC message arrival rate increases, both CN overload probability or RAN overload probability may be increased gradually to 100%. In the present disclosure, there is proposed a cell-aware group-based time control method for mass accesses in the heterogeneous MTC networks, which could adaptively adjust number of macro groups/femto groups, or adjust group size of the macro groups/the femto groups, and in turn adjust cycle time of MTC devices according to the current overload situations. From another perspective, cell-aware group-based time control method for mass accesses in the heterogeneous MTC network may be regarded as a method for grouping MTC devices by grouping macro base stations and femto base stations. As such, MTC devices served by the macro base stations and the femto base stations in heterogeneous MTC networks are grouped. Thereby, both the CN overload probability or RAN overload probability may be lowered, and in turn the CN overload or RAN overload are mitigated. Also, the proposed method may also reduce overall MTC message delay and control signaling overhead.

Throughout the disclosure, a wireless communication device may refer to a user equipment (UE), an intelligent appliance, a mobile station, an advanced mobile station, a wireless terminal communication device, an M2M device, an MTC device, and so forth. The wireless communication device may be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, an intelligent refrigerator, and so forth. Also, the base station (BS) may refer to an advanced base station, a node B, an enhanced node B (eNB), and so forth.

In the present disclosure, macro cell base station or macro cell can be abbreviated as "macro"; femto cell base station or femto cell can be abbreviated as "femto".

FIG. 1 illustrates a system architecture of a heterogeneous MTC network. Referring to FIG. 1, a heterogeneous MTC network 10 includes a macro MTC network and a femto MTC network. The heterogeneous MTC network 10 includes a plurality of femto MTC devices 111, . . . , 11n, a femto cell random access network (RAN) 12, Internet 13, a femto gateway 14, a core network (CN) 15, a serving GPRS support node (SGSN)/mobility management entity (MME) 16, a home location register (HLR)/home subscriber server (HSS) 17, a macro cell random access network (RAN) 18, a plurality of macro MTC devices 191, . . . , 19p, a gateway GPRS support node (GGSN)/packet data network gateway (PGW) 20, an MTC gateway 21 and an MTC server 22, where n and p are positive integers.

In the femto MTC network, the femto MTC devices 111, . . . , 11n are connected to the MTC server 22 through the one or more home eNodeBs/femto cell base stations 121 in the femto cell RAN 12, Internet 13, the femto gateway 14, the CN 15, the GGSN 20, the MTC gateway 21. In the macro MTC network, the macro MTC devices 191, . . . , 19p are connected to the MTC server 22 through the one or more macro cell eNodeBs/macro cell base stations 181 in the macro cell RAN 18, the SGSN/MME 16, the CN 15, the GGSN 20, and the MTC gateway 21.

Figure 2:
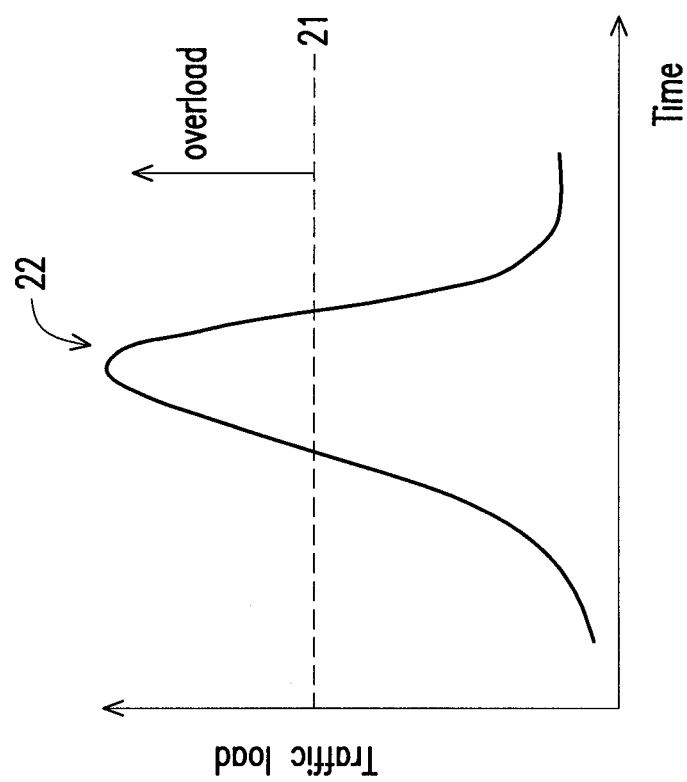
FIG. 2 illustrates an exemplary MTC network traffic load variation.

According to observation, the RAN overload may occur at the macro cell RAN 18; the CN overload may occur at the femto gateway 14, the CN 15, the SGSN/MME 16, the GGSN 20, the MTC gateway 21, and the MTC server 22. FIG. 2 illustrates an exemplary MTC network traffic load variation. As it can be seen in FIG. 2, the curve 22 represents MTC message traffic load changes over time. As the MTC message traffic load passes over the threshold 21, it is the overload (which may be the CN overload or the RAN overload depending on where the MTC message traffic load exceeds preconfigured threshold). Thus, in the present disclosure, there is proposed a cell-aware group-based time control method for the macro MTC devices and the femto MTC devices accessing the MTC server, and the proposed cell-aware group-based time control method could re-distribute MTC message traffic load from dynamically configured groups of femto MTC devices and macro MTC devices of a heterogeneous MTC network, according to the current load of the heterogeneous MTC network.

Figure 3:
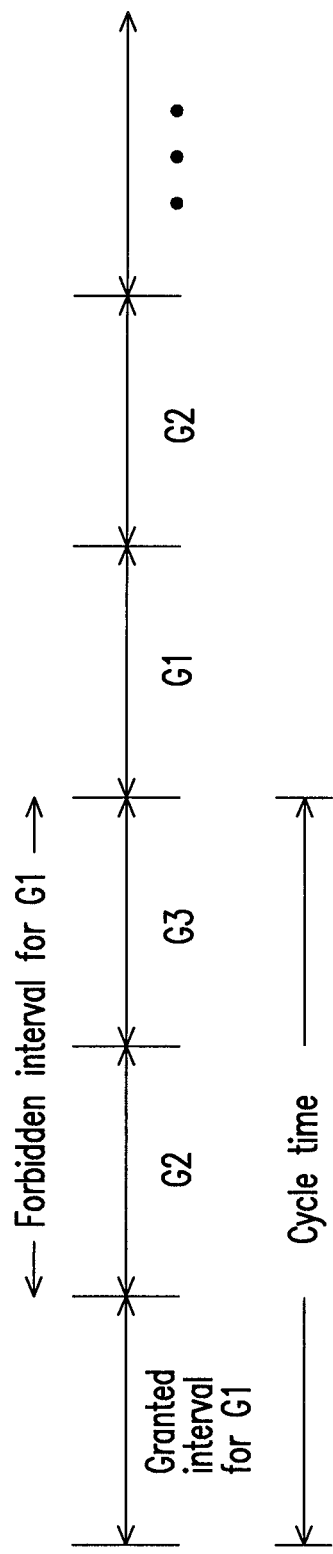
FIG. 3 illustrates a schematic diagram of a group-based time control method for accessing the MTC server according to an exemplary embodiment.

FIG. 3 illustrates a schematic diagram of a group-based time control method for accessing the MTC server according to an exemplary embodiment. Referring to FIG. 3, for example, a plurality of macro MTC devices may be divided into three macro groups, where each macro group is assigned with a granted interval such that the first macro group can access the MTC server only in the granted interval G1 but cannot access in forbidden interval consisting of time slots G2 and G3. The same principle can be applied to the second macro group and the third macro group. By doing so, the MTC message traffic can be spread over time. However, it can be observed that the cycle time of accessing the MTC server for each macro group is "G1+G2+G3". This phenomenon means that the more macro groups there are in the heterogeneous MTC network, the longer the delay any macro MTC device in each macro group has to wait before accessing the MTC server (which also includes the delay for accessing the serving macro cell base station). The similar concept illustrated in FIG. 3 can also be applied to a group-based time control method for the femto MTC devices accessing the MTC server.

By observation of the MTC traffic load in the heterogeneous MTC network, several observations could be obtained as summarized in Table I: there are usually random access collisions in the macro cell since there are more macro MTC devices served by one macro cell base station, but fewer random access collisions in the femto cells since there are only a few femto MTC devices served by one femto cell base station; RAN overload may frequently occur in the macro cells but seldom occur at the femto cells; CN overload may be contributed by MTC message traffic originated from both the macro cells and the femto cells. Additionally, the control message delivered from the MTC server to the macro MTC devices is mainly through broadcast via wireless transmission; on the other hand, the control message delivered from the MTC server to the femto cell may result in heavy control signalling traffic from femto gateway to femto cell base stations via wireline transmission.

TABLE I

| Heterogeneous MTC network | Random Access Collision | RAN Overload | CN Overload | Control Message |
| --- | --- | --- | --- | --- |
| Macro cell | Yes | Yes | Yes | Broadcast via wireless |
| Femto cell | Fewer | Seldom | Yes | Heavy control signalling traffic from femto gateway to femto cell base stations |

In the present disclosure, according to the aforementioned observations, a cell-aware adaptive group-based time control method for accessing the MTC server similar to FIG. 3 is proposed. In the proposed cell-aware group-based time control method for accessing the MTC server, femto MTC devices (or femto cell base stations) could be divided into one or more femto groups; on the other hand, macro MTC devices served by one or more macro base stations could be divided into one or more macro groups. It is also proposed to group femto MTC devices served by the same femto cell into the same femto group, so as to reduce the total control signaling traffic from the femto gateway to the femto cell base stations. Moreover, different groups (either femto groups or macro groups) may be allocated with different duration lengths of granted intervals, according to traffic characteristics or applications' requirements. For example, the higher-priority MTC devices could be grouped into a group with longer granted interval, in order to increase the transmission opportunities. The MTC devices with shorter-length messages could be grouped into a group with shorter granted interval.

Fairness is also considered in the proposed cell-aware adaptive group-based time control method for accessing the MTC server. According to the aforementioned observations, the femto MTC network can usually have lower message delay than peer macro MTC network, due to fewer collisions and RAN overload. To achieve the fairness, it is proposed to assign lower access probability in femto MTC network than that in peer macro MTC network. Further, it is observed that because of fewer collisions and RAN overload, the femto MTC network has higher successful probability of random access than the peer macro MTC network, and thus the CN overload may occur mainly due to MTC message traffic from the femto MTC network (also including MTC messages originated from femto MTC devices). Therefore, the cell-aware group-based time control method for accessing the MTC server may decrease access probability of the femto MTC network more rapidly than decrease that of the peer macro MTC network. Rapid reduction in the access probability of the femto MTC network could thus reduce successive CN overload in the present embodiment. Additionally, it is proposed to maintain less control signaling for the femto MTC network or fewer attempts transmitting control signaling to the femto MTC network as less frequently as possible in the present embodiment.

Figure 4:
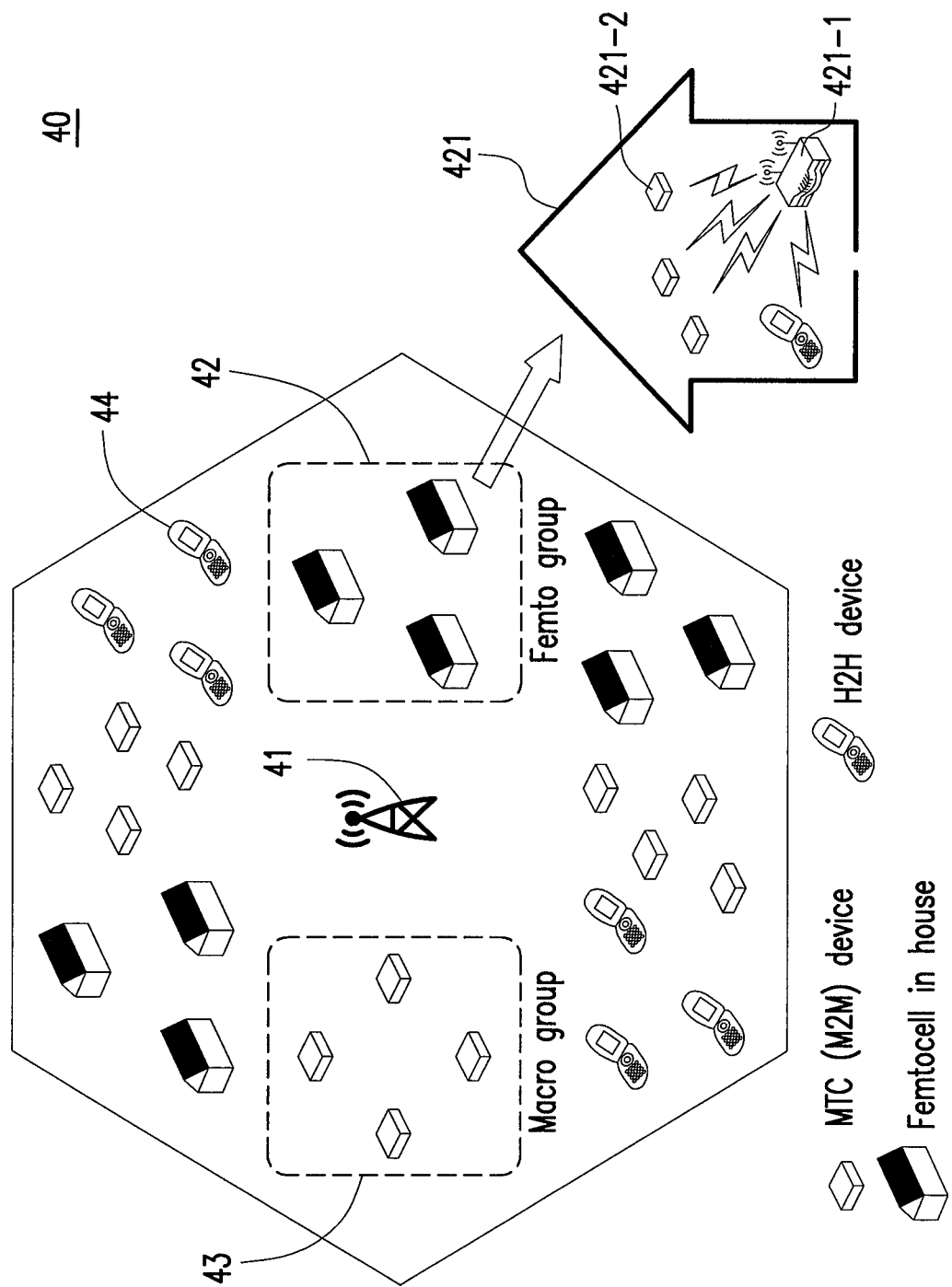
FIG. 4 illustrates a heterogeneous MTC network according to an exemplary embodiment.

FIG. 4 illustrates a heterogeneous MTC network according to an exemplary embodiment. FIG. 4 also illustrates the concept of grouping in a heterogeneous MTC network 40, in which the cell-aware adaptive group-based time control method for accessing the MTC server of the present disclosure can be operated. In principle, there are two main groups such as macro groups in which all MTC devices served by macro cell base stations are partitioned into macro groups; and femto groups in which all MTC devices served by femto cell base stations are partitioned into femto groups. Similar to the heterogeneous MTC network illustrated in FIG. 1, all femto groups in this embodiment are connected to the MTC server through femto cell base stations, Internet, the femtocell gateway, the core network, the GGSN/PGW, and the MTC gateway. In other embodiments, the MTC server can be a femto gateway, an MME, a GGSN, or an MTC gateway. In the present disclosure, MTC devices in the same femto cell are grouped into the same femto group, and thus this cell-aware grouping method may reduce total signaling overhead. Further, regarding the macro groups, when a new macro MTC device camps on the serving macro cell, this newly joined or newly connected macro MTC device can be grouped by the MTC server to the macro group with fewer devices.

The heterogeneous MTC network 40 illustrated in FIG. 4 merely serves as an example, and the heterogeneous MTC network 40 in principle can include more than one macro cells. The heterogeneous MTC network 40 includes at least one macro cell, and one of the at least one macro cell is served by a macro cell base station 41, which serves MTC devices (such as a macro group 43) and human-to-human (H2H) devices (such as a H2H device 44). The H2H devices, for example, may be mobile phones or smartphones which are mainly used for human interactions. Within the radio service coverage of the macro cell base station 41, there are macro groups and femto groups (such as a femto group 42). The femto group 42, for example, includes femto cells (deployed in houses or buildings), and these femto cells are grouped by the MTC server in one femto group. One of the femto cells in the femto group 42 is a femto cell 421, which includes a femto cell base station 421-1 serving more than one femto MTC devices (one of them is a femto MTC device 421-2) and/or H2H devices.

Figure 5:
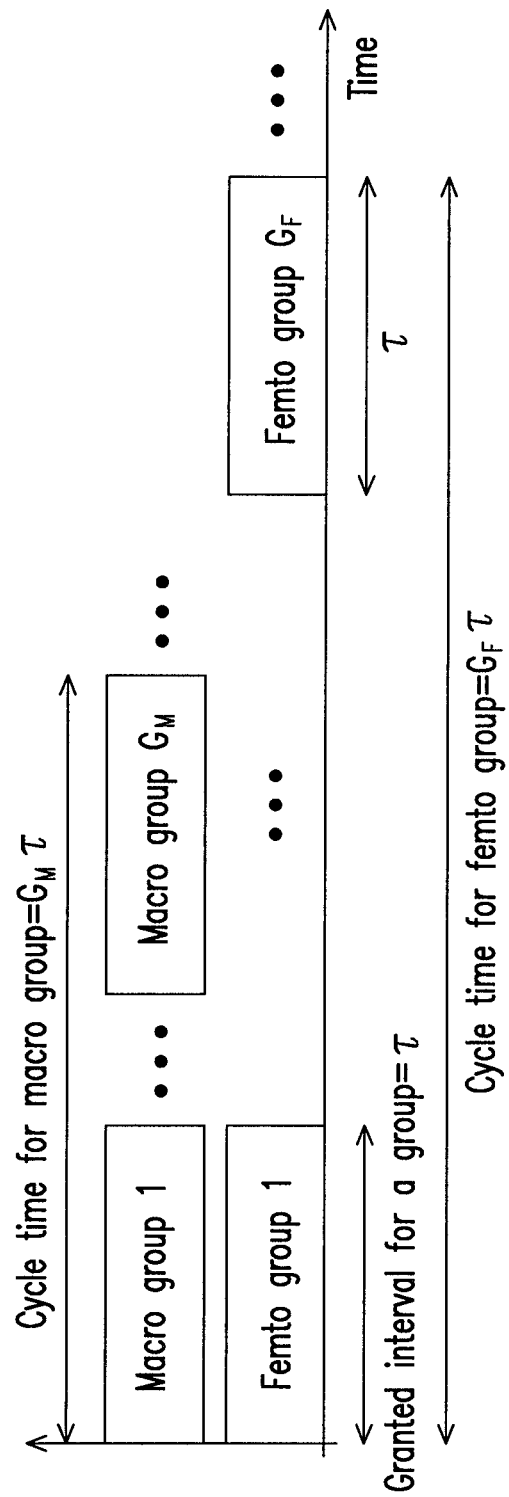
FIG. 5 is a schematic diagram illustrating a cell-aware adaptive group-based time control method for accessing MTC server in a heterogeneous MTC network according to an exemplary embodiment.

FIG. 5 is a schematic diagram illustrating a cell-aware adaptive group-based time control method for accessing MTC server in a heterogeneous MTC network according to an exemplary embodiment. The cell-aware adaptive group-based time control method in FIG. 5 adopts the similar concept illustrated in FIG. 3. For the simplicity of illustration, granted intervals for macro groups and femto groups have identical duration length ($\tau$), and the granted intervals for macro groups and femto groups are aligned. The present disclosure is not limited to the identical duration granted intervals $\tau$. In another embodiment, all macro groups may have the same granted intervals $\tau_1$, and all femto groups may have the same granted intervals $\tau_2$. The granted intervals $\tau_1$ may be different from the granted intervals $\tau_2$, which may be controlled by the MTC server. Furthermore, in other embodiments, different groups (either femto groups or macro groups) may have various granted intervals, that is, any arbitrary two groups may have different granted intervals.

In the embodiment shown in FIG. 5, the top half of FIG. 5 shows granted intervals for macro group 1, . . . , and macro group $G_M$. Thus, the cycle time for each of the macro groups 1, . . . , and $G_M$ could be "$G_M \tau$". The lower half of FIG. 5 shows granted intervals for femto group 1, . . . , and femto group $G_F$, where $G_F$ may be different from $G_M$. Thus, the cycle time for each of the femto groups 1, . . . , and $G_F$ could be "$G_F \tau$". In the cell-aware adaptive group-based time control method for accessing MTC server, each macro MTC device can only send MTC service request in the granted interval of its assigned macro group, and each femto MTC device can only send MTC service request in the granted interval of its assigned femto group.

Further, in the specified granted interval, an active MTC device (either a macro MTC device or a femto MTC device) could select a random access preamble to send its MTC service request, with a preconfigured access probability. It may be expected that some collisions (or random access collisions) may occur when two (or more) MTC devices select the same random access preamble in the same random access resource, where the random access resource in the present disclosure may be defined as a specific time and frequency domain radio resource allocated for random access by the wireless communication network (that is, the heterogeneous MTC network in this case).

In the present disclosure, in order to clearly illustrate procedures of adaptively adjusting access probability of macro MTC devices or femto MTC devices and procedures of adaptively adjusting group arrangement (such as splitting a group or merging groups), there are some technical terms defined as follows. The RAN overload in the present disclosure may be defined as "the number of random access requests received by an eNB (a macro cell base station or a femto cell base station) in a granted interval being greater than $Th_{RAN}$", where the $Th_{RAN}$ may be the capacity threshold of MTC communications in the macro cell base station or a femto cell base station, and may be more specifically defined as the RAN capacity ($C_{RAN}$) multiplied by an X percentage (i.e., $C_{RAN}*X$ %).

With a similar manner, the CN overload in the present disclosure may be defined as "the number of MTC connection requests received by an MTC server from all MTC devices in a granted interval being greater than $Th_{CN}$", where the $Th_{CN}$ may be the capacity threshold of MTC communications in core network, and may be more specifically defined as the CN capacity ($C_{CN}$) multiplied by a Y percentage (i.e., $C_{CN}*Y\%$), where Y may be different from X. Further, it is also considered the MTC message delay in the cell-aware adaptive group-based time control method for accessing MTC server. The MTC message delay in the present disclosure may be defined as an elapsed time from the time instant where the MTC message is generated at any MTC device to another time instant where the MTC message is received by the MTC server.

In an exemplary embodiment, procedures of the cell-aware adaptive group-based time control method for accessing MTC server may include two major sub-processes, where all MTC devices are grouped into macro groups and femto groups by the MTC server. The first sub-process includes an adaptive access probability adjustment procedure, which attempts to lower access probability of MTC devices after several successive random access collisions or the RAN overload or the CN overload occur, and also attempts to increase access probability of MTC devices after several successful (or accumulated successful) MTC message deliveries (MTC message transmissions) occur. The second sub-process includes an adaptive group rearrangement procedure, which attempts to lower the CN overload probability in the MTC networks by group splitting after the MTC server detects the CN overload. It is noted that when the group is split, the number of MTC devices in a group is decreasing and then the RAN overload probability could be also reduced. The second sub-process also attempts to reduce MTC access delay (or MTC message delay) by group merging after the MTC server detects several successful (or accumulated successful) MTC message deliveries (MTC message transmissions), because the smaller number of groups may lead to shorter cycle time.

It is noted that, in some embodiment of the present disclosure, the cell-aware adaptive group-based time control method for accessing MTC server may only perform the adaptive access probability adjustment procedure and/or the adaptive group rearrangement procedure on either macro groups or femto groups. However, in other embodiment, the cell-aware adaptive group-based time control method for accessing MTC server may perform the adaptive access probability adjustment procedure and the adaptive group rearrangement procedure on both the macro groups and the femto groups. In other embodiment, the cell-aware adaptive group-based time control method for accessing MTC server may perform only the adaptive group rearrangement procedure on either macro groups or femto groups. In other embodiment, the cell-aware adaptive group-based time control method for accessing MTC server may perform only the adaptive group rearrangement procedure on both the macro groups and the femto groups.

Figure 6:
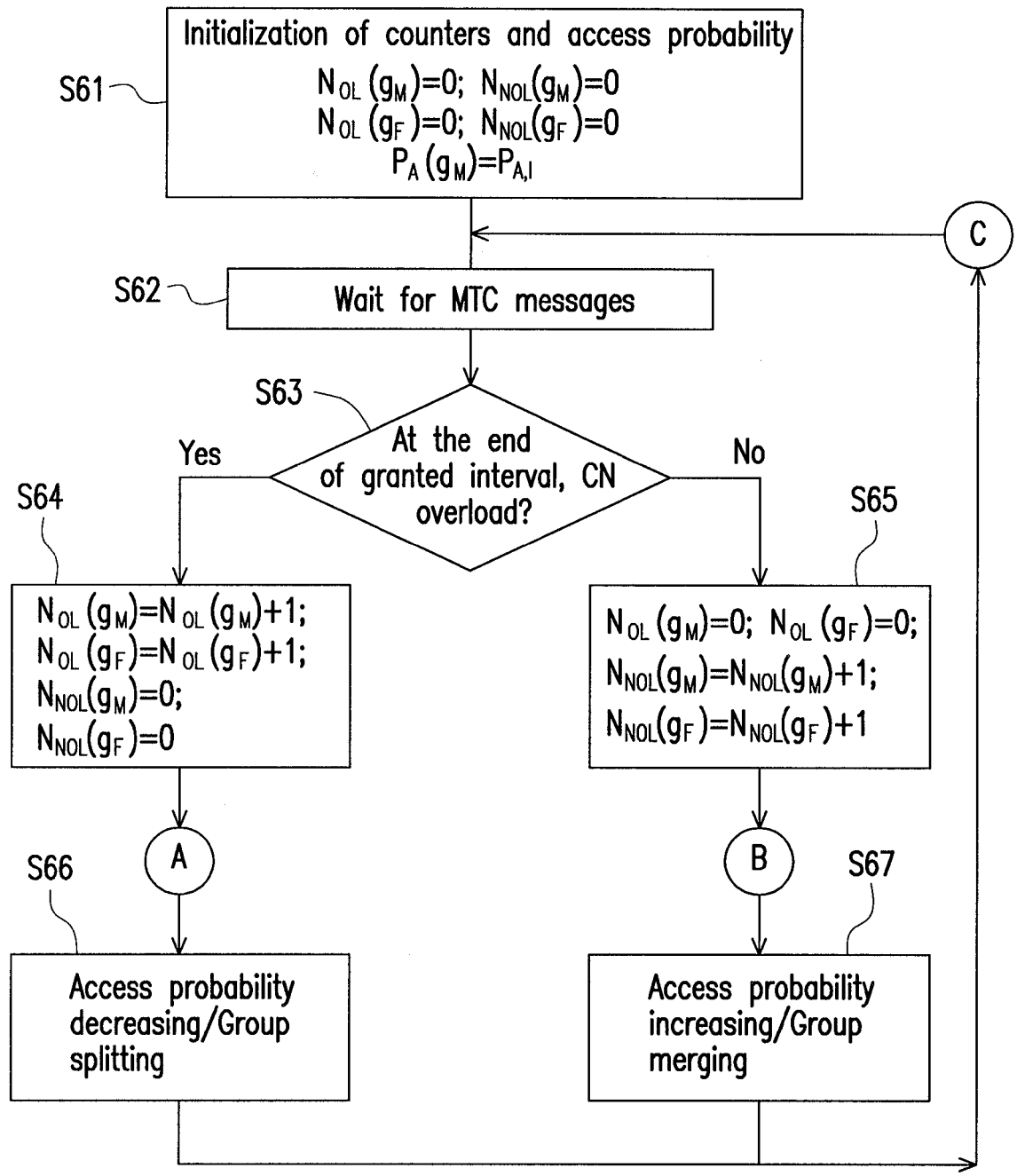
FIG. 6 is a flowchart of an adaptive access probability adjustment procedure/group arrangement process according to an exemplary embodiment.

FIG. 6 is a flowchart of an adaptive access probability adjustment procedure/group arrangement process according to an exemplary embodiment. The adaptive access probability adjustment procedure/group arrangement process illustrated in FIG. 6 may be executed by an MTC server or the MTC core network of the heterogeneous MTC network. The MTC server may have at least four overload counters. The first overload counter, $N_{OL}(g_M)$, counts the number of cycles that the CN overload associated with the macro group $g_M$ occurs consecutively. The second overload counter, $N_{NOL}(g_M)$, counts the number of cycles that the CN overload associated with the macro group $g_M$ does not occur consecutively. The third overload counter, $N_{OL}(g_F)$, counts the number of cycles that the CN overload associated with the femto group $g_F$ occurs consecutively. The fourth overload counter, $N_{NOL}(g_F)$, counts the number of cycles that the CN overload associated with the femto group $g_F$ does not occur consecutively. The MTC server also assigns initial access probability, $P_A(g_M)$, of macro groups. As mentioned previously regarding FIG. 5, it is considered that the granted intervals for the macro groups and the femto groups are aligned for the simplicity of explanation.

Referring to FIG. 6, the adaptive access probability adjustment procedure/group arrangement process starts from step S61. In step S61, the MTC server could initialize the overload counters, and assign initial access probability, $P_A(g_M)$. That is, the first overload counter, $N_{OL}(g_M)$, the second overload counter, $N_{NOL}(g_M)$, the third overload counter, $N_{OL}(g_F)$, and the fourth overload counter, $N_{NOL}(g_F)$ are initialized (that is, $N_{OL}(g_M)=0$; $N_{NOL}(g_M)=0$; $N_{OL}(g_F)=0$; and $N_{NOL}(g_F)=0$). Meanwhile, the initial access probability is assigned as $P_A(g_M)=P_{A,I}$. In step S62, the MTC server could wait for MTC messages from MTC devices. In step S63, the MTC server could determine whether the CN overload occurs at the end of granted interval, and the determination may be referred to exemplary definition of the CN overload described previously. When the CN overload occurs in the step S63, step S64 is executed after the step S63; otherwise, step S65 is executed after the step S63.

In the step S64, the MTC server increases the first overload counter $N_{OL}(g_M)$ and the third overload counter $N_{OL}(g_F)$ by one unit, but initializes the second overload counter $N_{NOL}(g_M)$ and the fourth overload counter $N_{NOL}(g_F)$ to zero unit. In step S65, the MTC server increases the second overload counter $N_{NOL}(g_M)$ and the fourth overload counter $N_{NOL}(g_F)$ by one unit, but initializes the first overload counter $N_{OL}(g_M)$ and the third overload counter $N_{OL}(g_F)$ to zero unit. Step S66 is executed after the step S64; step S67 is executed after the step S65.

Figure 7:
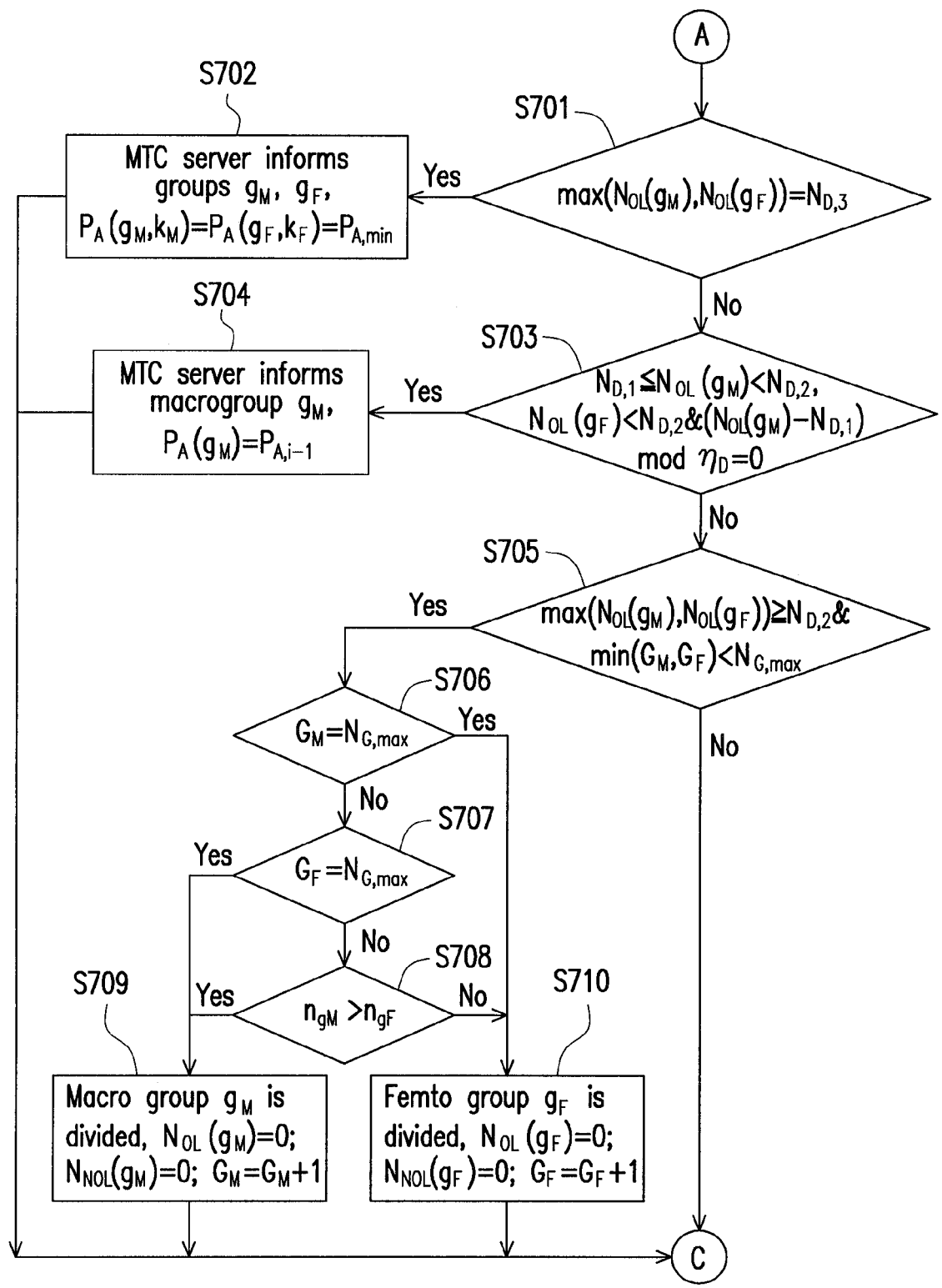
FIG. 7 is a flowchart of an access probability decreasing/group splitting process according to an exemplary embodiment.

In the step S66, the MTC server performs an access probability decreasing/group splitting process (for either the macro groups or the femto groups), which will be further described in FIG. 7. In particular, in the step S66, the MTC server could determine whether to decrease the access probability for a macro group or a femto group, or to split a group of macro groups or femto groups. In step S67, the MTC server performs an access probability increasing/group merging process (for either the macro groups or the femto groups), which will be further described in FIG. 8. In particular, in the step S67, the MTC server could determine whether to increase the access probability for a macro group or a femto group, or to merge two groups of macro groups or femto groups. After the step S66 or the step S67, it is return to execute the step S62.

FIG. 7 is a flowchart of an access probability decreasing/group splitting process according to an exemplary embodiment. FIG. 7 provides a more detailed implementation of the step S66 in FIG. 6. Referring to FIG. 7, the access probability decreasing/group splitting process includes three major sub-processes. The first sub-process in FIG. 7 is that when CN overload consecutively occurs several cycles and the MTC server determines that the condition illustrated in the step S703 is satisfied, the MTC server informs the macro group $g_M$ of decreasing its current initial access probability by one level. The macro group $g_M$ is preconfigured with I levels of initial access probabilities, where I is a positive integer. The first sub-process may not adjust access probability of femto groups, and this may reduce signaling overhead of the femto cells. The second sub-process in FIG. 7 is that when the MTC server determines that the CN overload continues occurring and the condition of the step S705 is satisfied, the MTC server determines to split a femto group or a macro group, which may be referred to step S706 to step S710. The third sub-process in FIG. 7 is that when the first overload counter $N_{OL}(g_M)$ or the third overload counter $N_{OL}(g_F)$ reaches a preconfigured overload upper threshold $N_{D,3}$ (as the condition of the step S701 is satisfied), the MTC server informs all the MTC devices in the macro group $g_M$ and the femto group $g_F$ to reduce their access probabilities to a preconfigured minimum access probability (or a very low access probability), $P_{A, min}$.

The access probability decreasing/group splitting process attempts to firstly decrease access probability of groups and then split groups, and this may reduce the CN overload, and then gradually reduce the random access collisions and the RAN overload. In the present embodiment, there are three threshold, $N_{D,1}$, $N_{D,2}$, and $N_{D,3}$ in the access probability decreasing/group splitting process, and it is preconfigured that $N_{D,1} < N_{D,2} < N_{D,3}$. Moreover, the threshold "$N_{G,max}$" refers to a maximum number of groups, or a preconfigured group number upper limit. In FIG. 7, it is assumed that the maximum allowable delay is $D_{max}$, the granted interval is $\tau$, and the total group upper threshold $N_{G,max}$ may be defined as $D_{max}/\tau$. For example, if $D_{max}$ is 15 seconds and the granted interval is $\tau=10$ milliseconds, $N_{G,max}$ may be 1,500.

Referring to FIG. 7, the access probability decreasing/group splitting process starts from the point A and then executes the step S701. In the step S701, the MTC server determines whether the condition "$\max(N_{OL}(g_M), N_{OL}(g_F))=N_{D,3}$" is satisfied. When the condition of the step S701 is satisfied, step S702 is executed after the step S701; otherwise the step S703 is executed after the step S701. In the step S702, the MTC server informs all the MTC devices of the macro group $g_M$ and the femto group $g_F$ that the access probability should be decreased to a preconfigured minimum access probability, that is, $P_A(g_M, k_M)=P_A(g_F, k_F)=P_{A, min}$. In the step S703, when the condition of "$N_{D,1} \leq N_{OL}(g_M) < N_{D,2}$ & $N_{OL}(g_F) < N_{D,2}$ & $(N_{OL}(g_M)-N_{D,1}) \mod \eta_D=0$" is satisfied, step S704 is executed after the step S703. In the step S704, the MTC server informs the macro group $g_M$ that the initial access probability is decreased to $P_A(g_M)=P_{A, i-1}$. That is, every time the CN overload occurs consecutively for $\eta_D$ cycle times, which may be a predefined cycle times, the initial access probability $P_A(g_M)$ of the macro group $g_M$ is reduced by one level, where the initial access probability $P_A(g_M)$ are configured with I levels, and $P_{A, I} > \ldots > P_{A,2} > P_{A,1} > P_{A, min}$.

When the condition of the step S703 is not satisfied, the step S705 is executed after the step S703. In the step S705, the MTC server determines whether the condition of "$\max(N_{OL}(g_M), N_{OL}(g_F)) \geq N_{D,2}$ & $\min(G_M, G_F) < N_{G,max}$" is satisfied. When the condition of the step S705 is not satisfied, the access probability decreasing/group splitting process returns to the point C, which further returns to execute the step S62 in FIG. 6. When the condition of the step S705 is satisfied, the MTC server determines to split a larger group, which refers to executing the step S706 after the step S705.

It is noted that, in FIG. 7, the total number of MTC devices in the femto group $g_F$ refers to $n_{gF}$, and the total number of MTC devices in the macro group $g_M$ refers to $n_{gM}$. The total number of the macro groups refers to $G_M$, and the total number of the femto groups refers to $G_F$. In step S706, the MTC server determines whether the condition of "$G_M=N_{G,max}$" is satisfied. When the condition of the step S706 is satisfied, the step S710 is executed after the step S706; otherwise, the step S707 is executed after the step S706. In the step S710, the femto group $g_F$ is divided, so "$G_F=G_F+1$".

In the step S707, the MTC server determines whether the condition "$G_F=N_{G,max}$" is satisfied. When the condition of the step S707 is satisfied, the step S709 is executed after the step S707; otherwise, step S708 is executed after the step S707. In the step S708, the MTC server determines whether "$n_{gM} > n_{gF}$". By the step S708, the MTC server can select a larger group between the macro group $g_M$ and the femto group $g_F$ to be divided. When the condition of the step S708 is satisfied, the step S709 is executed after the step S708; otherwise, the step S710 is executed after the step S708. In the step S710, the femto group $g_F$ is larger than the macro group $g_M$, so the femto group $g_F$ is divided and "$G_F=G_F+1$"; and the third overload counter $N_{OL}(g_F)$ and the fourth overload counter $N_{NOL}(g_F)$ are initialized (that is, $N_{OL}(g_F)=0$ and $N_{NOL}(g_F)=0$). In the step S709, the macro group $g_M$ is larger, so the macro group $g_M$ is divided and "$G_M=G_M+1$"; and the first overload counter $N_{OL}(g_M)$ and the second overload counter $N_{NOL}(g_M)$ are initialized (that is, $N_{OL}(g_M)=0$ and $N_{NOL}(g_M)=0$). After the step S709 or the step 710, the access probability decreasing/group splitting process returns to the point C, which further returns to execute the step S62 in FIG. 6.

Figure 8:
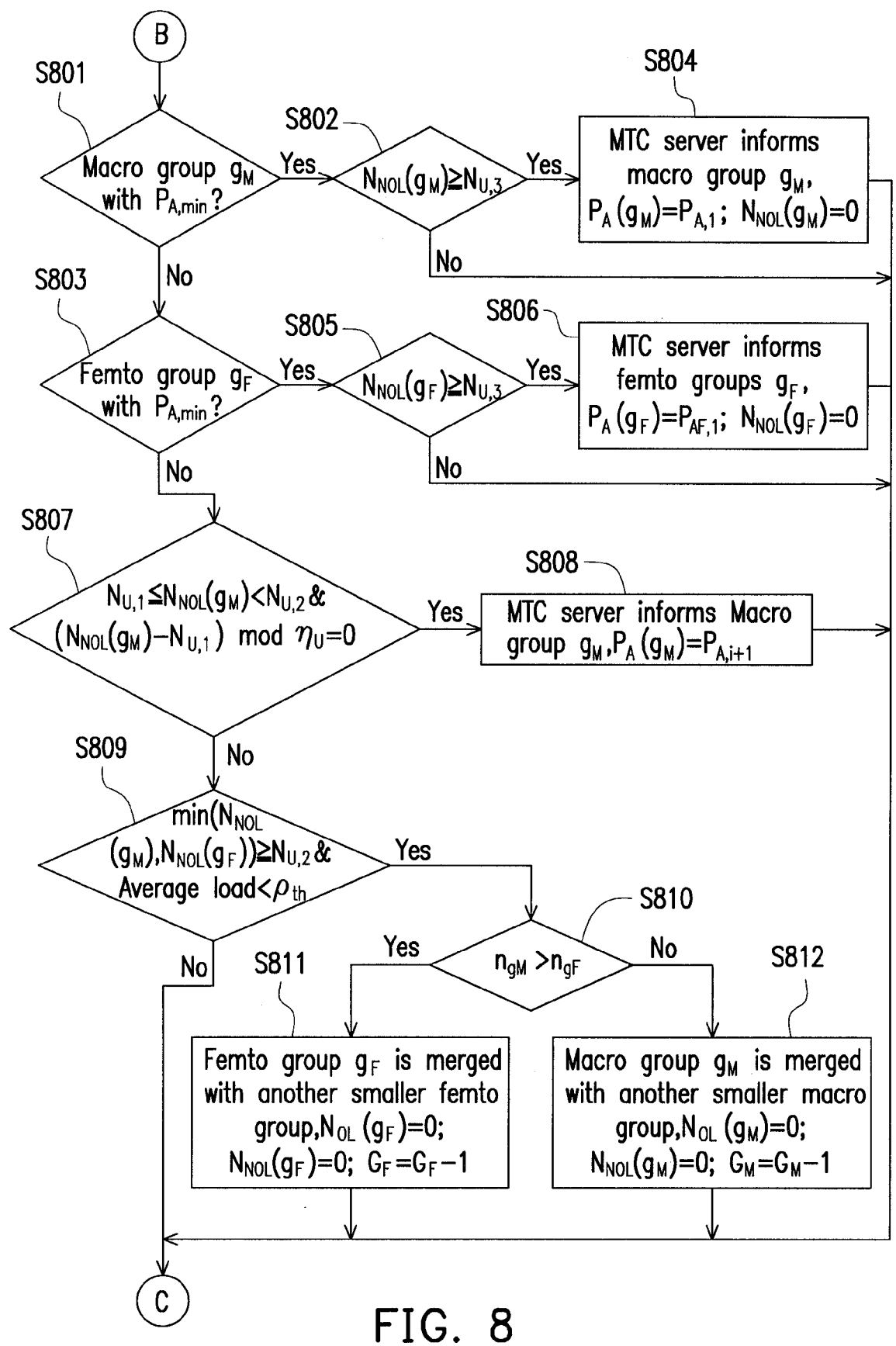
FIG. 8 is a flowchart of an access probability increasing/group merging process according to an exemplary embodiment.

FIG. 8 is a flowchart of an access probability increasing/group merging process according to an exemplary embodiment. FIG. 8 provides a more detailed implementation of the step S67 in FIG. 6. In the present embodiment, the parameters are preconfigured as "$N_{U,1} > N_{D,1}$; $N_{U,2} > N_{D,2}$; $N_{U,3} > N_{D,3}$" and "$\eta_U > \eta_D$". Besides, the access probability increasing/group merging process attempts to firstly increase the access probability of groups and then merge groups. Merging groups may reduce overall MTC message delay, due to shorter cycle time. Further, the MTC server selects a smaller one between the femto group $g_F$ and the macro group $g_M$ to be merged with another small group in the same grouping. For example, if the femto group $g_F$ is smaller than the macro group $g_M$, the MTC server selects another femto group which is the smallest one of other femto groups to be merged with the femto group $g_F$. If the macro group $g_M$ is smaller than the femto group $g_F$, the MTC server selects the smallest one of other macro groups to be merged with the macro group $g_M$. The merging of groups occurs when the MTC server determines that the CN overload does not consecutively occur for $N_{U,2}$ cycle times, and the average MTC message load is less than the preconfigured load threshold $\rho_{th}$.

Referring to FIG. 8, the access probability increasing/group merging process starts from the point B, and continues to execute step S801. In the step S801, the MTC server determines whether the macro group $g_M$ is re-configured with $P_{A, min}$. When the condition of the step S801 is satisfied, step S802 is executed after the step S801, in order to further determine whether the CN overload does not occur consecutively for $N_{U,3}$ cycle times according to the condition of "$N_{NOL}(g_M) \geq N_{U,3}$". When the condition of the step S801 is not satisfied, step S803 is executed after the step S801. When the condition of the step S802 is satisfied, step S804 is executed after the step S802; otherwise, the access probability increasing/group merging process returns to the point C, which further returns to execute the step S62 in FIG. 6.

In the step 803, the MTC server determines whether the femto group $g_F$ is re-configured with $P_{A, min}$. When the condition of the step S803 is satisfied, step S805 is executed after the step S803, in order to further determine whether the CN overload does not occur consecutively for $N_{U,3}$ cycle times according to the condition of "$N_{NOL}(g_F) \geq N_{U,3}$". When the condition of the step S803 is not satisfied, step S807 is executed after the step S803. When the condition of the step S805 is satisfied, step S806 is executed after the step S805; otherwise, the access probability increasing/group merging process returns to the point C, which further returns to execute the step S62 in FIG. 6.

In the step S804, the MTC server informs all the MTC devices in the macro group $g_M$ to increase their initial access probabilities to $P_A(g_M)=P_{A,1}$, and also initializes the second overload counter $N_{NOL}(g_M)=0$. In the step S806, the MTC server informs the femto group $g_F$ that the access probability is increased to $P_A(g_F)=P_{AF,1}$; and also initializes the fourth overload counter $N_{NOL}(g_F)=0$.

In the step 807, the MTC server determines whether the condition of "$N_{U,1} \leq N_{NOL}(g_M) < N_{U,2}$ & $(N_{NOL}(g_M)-N_{U,1})$ mod $\eta_U=0$" is satisfied. When the condition of the step S807 is satisfied, step S808 is executed after the step S807; otherwise, step S809 is executed after the step S807. In the step S808, the MTC server informs all the MTC devices in the macro group $g_M$ to increase their initial access probabilities to $P_A(g_M)=P_{A,i+1}$. By the steps S807 and S808, every time the CN overload does not occur consecutively for $\eta_U$ cycle times, the initial access probability $P_A(g_M)$ of the macro group $g_M$ is increased by one level. In the step S809, the MTC server determines whether the condition of "min($N_{NOL}(g_M)$, $N_{NOL}(g_F)) \geq N_{U,2}$ & average load<$\rho_{th}$=0" is satisfied, where the threshold "$\rho_{th}$" refers to a preconfigured average MTC message upper limit. When the condition of the step S809 is satisfied, step S810 is executed after the step S809; otherwise, the access probability increasing/group merging process returns to the point C, which further returns to execute the step S62 in FIG. 6.

In the step S810, the MTC server determines whether "$n_{gM} > n_{gF}$". By the step S810, the MTC server can select a smaller group between the macro group $g_M$ and the femto group $g_F$, to be merged with another group in the same grouping. When the condition of the step S810 is satisfied, the step S811 is executed after the step S810; otherwise, the step S812 is executed after the step S810. In the step S811, the femto group $g_F$ is merged with the smallest one of other femto groups, so "$G_F=G_F-1$", and the MTC server initializes the third overload counter, $N_{OL}(g_F)$ and the fourth overload counter, $N_{NOL}(g_F)$ (that is, $N_{OL}(g_F)=0$ & $N_{NOL}(g_F)=0$). In the step S812, the macro group $g_M$ is merged with the smallest one of other macro groups, so "$G_M=G_M-1$", and the MTC server initializes the first overload counter, $N_{OL}(g_M)$ and the second overload counter, $N_{NOL}(g_M)$ (that is, $N_{OL}(g_M)=0$ & $N_{NOL}(g_M)=0$). After the steps S804, S806, S808, S811 or S812, the access probability increasing/group merging process returns to the point C, which further returns to execute the step S62 in FIG. 6.

Figure 9:
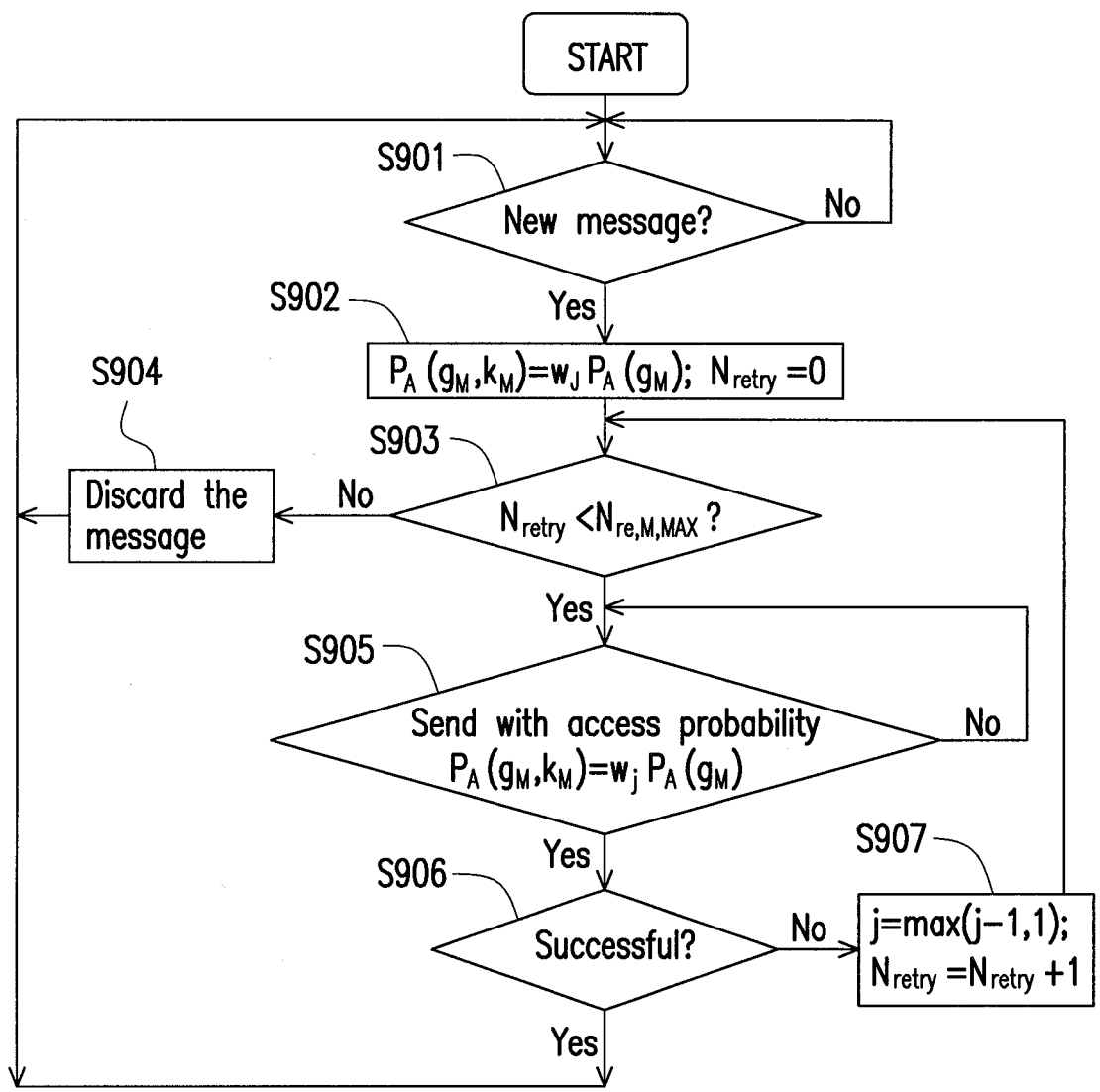
FIG. 9 is a flowchart of an access probability adjustment process of a macro MTC device according to an exemplary embodiment.

FIG. 9 is a flowchart of an access probability adjustment process of a macro MTC device according to an exemplary embodiment. The access probability adjustment process in FIG. 9 can be executed at a macro MTC device, and mainly decreases access probability of the macro MTC device when the MTC service request is unsuccessful (the unsuccessful access request may occur due to random access collision or RAN overload or CN overload), in order to reduce the collision or RAN overload or the CN overload. There is preconfigured an initial access probability $P_A(g_M)$ for a new MTC message of the macro MTC device belonging to the macro group $g_M$, which may be later adjusted by the MTC server. There are further preconfigured J levels of access probabilities with weighting factor $w_j$ such as $w_J P_A(g_M) = P_A(g_M) > \ldots > w_2 P_A(g_M) > w_1 P_A(g_M)$, where $0 < w_j \leq 1$. In the present embodiment, after h consecutive random access request failures (due to random access collision or RAN overload or CN overload), the access probability for the macro MTC device $k_M$ in the macro group $g_M$ may be adjusted according to following equation (1).

$$P_A(g_M, k_M) = \begin{cases} w_{(J-h)} P_A(g_M), & \text{for } h \leq J \\ w_1 P_A(g_M), & \text{for } h > J \end{cases} \quad \text{equation (1)}$$

The access probability adjustment process in FIG. 9 starts from step S901, and in the step S901, the macro MTC device $k_M$ belonging to the macro group $g_M$ determines whether there is a new MTC message required to be delivered to the MTC server. When there is a new MTC message determined in the step S901, the step S902 is executed after the step S901; otherwise, it returns to execute the step S901 again. In the step S902, since it is the first time to transmit a new MTC message, the macro MTC device $k_M$ initializes its access probability $P_A(g_M, k_M)$ as the initial access probability $w_J P_A(g_M)$, and a retry counter $N_{retry}$. That is, for a macro MTC device $k_M$, $P_A(g_M, k_M)=w_J P_A(g_M)$, and $N_{retry}=0$. After the step S902, step S903 is executed.

In step S903, the macro MTC device $k_M$ determines whether the condition of "$N_{retry} < N_{re, M, MAX}$" is satisfied, where the maximum retry limit (a preconfigured retry upper threshold) for the macro MTC device $k_M$ is denoted as $N_{re, M, MAX}$. When the condition in the step S903 is not satisfied (that is, the number of retries to deliver the same MTC message has reached its preconfigured maximum retry limit), the MTC message is discarded in the step S904; otherwise, the step S905 is executed after the step S903.

In the step S905, the macro MTC device $k_M$ transmits the MTC message with an access probability $P_A(g_M, k_M)=w_j P_A(g_M)$, where $w_j$ refers to the j-th level weighting factor of access probability. In the step S905, the macro MTC device $k_M$ generates a random number. When the random number is less than the access probability $P_A(g_M, k_M)=w_j P_A(g_M)$, the macro MTC device $k_M$ sends the MTC message, and the step S906 is executed after the step S905. When the random number is greater than the access probability $P_A(g_M, k_M)$, it returns to execute the step S905 in the granted interval of a next cycle. In the step S906, the macro MTC device $k_M$ determines whether delivery of the MTC message is successful. When the delivery of the MTC message is successful in the step S906, it returns to the step S901 to wait for delivering the next MTC message; otherwise, step S907 is executed after the step S906.

In the step S907, the macro MTC device $k_M$ decreases the weighting factor $w_j$ of access probability by one level according to the equation (j=max(j−1, 1)), and increases the retry counter $N_{retry}$ by one unit (that is, $N_{retry}=N_{retry}+1$). Thus, the access probability $P_A(g_M, k_M)$ is decreased by one level. After the step S907, it returns to execute the step S903.

Figure 10:
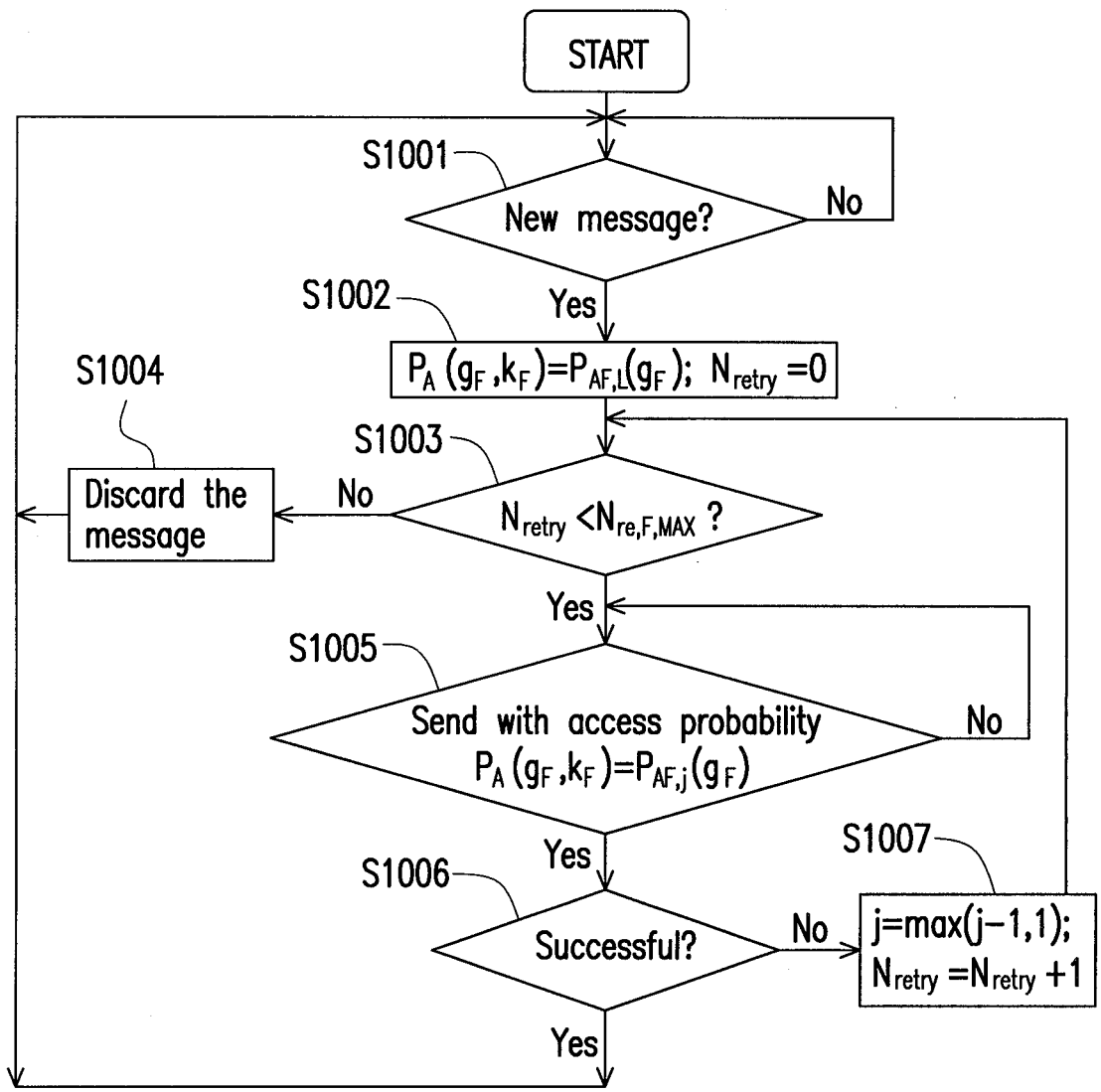
FIG. 10 is a flowchart of an access probability adjustment process of a femto MTC device according to an exemplary embodiment.

FIG. 10 is a flowchart of an access probability adjustment process of a femto MTC device according to an exemplary embodiment. The access probability adjustment process in FIG. 10 can be executed at a femto MTC device, and mainly decreases access probability of the femto MTC device when the MTC service request is unsuccessful (the unsuccessful access request may occur due to random access collision or RAN overload or CN overload), in order to reduce the collision or RAN overload or the CN overload. There is preconfigured an initial access probability $P_{AF,L}(g_F)$ for a new MTC message of a femto MTC device $k_F$ belonging to the femto group $g_F$, and the initial access probability $P_{AF,L}(g_F)$ may not be controlled by the MTC server, which may reduce signaling overheads of the femto cells and femto gateway. There are preconfigured L levels of access probabilities for a femto MTC device, such as $P_{AF,L}(g_F) > \ldots > P_{AF,2}(g_F) > P_{AF,1}(g_F)$. In the present embodiment, $P_{AF,L}(g_F)$ may be configured less than the access probability of the MTC devices in the macro groups, for example, $P_{AF,1}(g_F) < w_1 P_A(g_M)$ and $P_{AF,j}(g_F) < w_j P_A(g_M)$. Additionally, the access probability for the femto MTC device is decreased faster than the access probability for the MTC devices in the macro groups, which may effectively reduce the CN overload.

The access probability adjustment process in FIG. 10 starts from step S1001, and in the step S1001, the femto MTC device $k_F$ belonging to the femto group $g_F$ determines whether there is a new MTC message required to be delivered to the MTC server. When there is a new MTC message determined in the step S1001, step S1002 is executed after the step S1001; otherwise, it returns to execute the step S1001 again. In the step S1002, since it is the first time to transmit a new MTC message, the femto MTC device $k_F$ initializes its access probability as the initial access probability $P_{AF,L}(g_F)$, and a retry counter $N_{retry}$. That is, for a femto MTC device $k_F$, $P_A(g_F, k_F) = P_{AF,L}(g_F)$, and $N_{retry} = 0$. After the step S1002, step S1003 is executed.

In step S1003, the femto MTC device $k_F$ determines whether the condition of "$N_{retry} < N_{re,F,MAX}$" is satisfied, where the maximum retry limit (a preconfigured retry upper threshold) for the femto MTC device $k_F$ is denoted as $N_{re,F,MAX}$. When the condition in the step S1003 is not satisfied (that is, the number of retries to deliver the same MTC message has reached its preconfigured maximum retry limit), the MTC message is discarded in the step S1004; otherwise, step S1005 is executed after the step S1003.

In the step S1005, the femto MTC device $k_F$ transmits the MTC message with an access probability $P_A(g_F, k_F) = P_{AF,j}(g_F)$, where j refers to the j-th level access probability. In the step S1005, the femto MTC device $k_F$ generates a random number. When the random number is less than the access probability $P_A(g_F, k_F) = P_{AF,j}(g_F)$, the femto MTC device $k_F$ sends the MTC message, and the step S1006 is executed after the step S1005. When the random number is greater than the access probability $P_A(g_F, k_F)$, it returns to executed the step S1005 in the granted interval of a next cycle. In the step S1006, the femto MTC device $k_F$ determines whether delivery of the MTC message is successful. When the delivery of the MTC message is successful in the step S1006, it returns to the step S1001 to wait for delivering of the next MTC message; otherwise, step S1007 is executed after the step S1006.

In the step S1007, the femto MTC device $k_F$ decreases the access probability $P_A(g_F, k_F) = P_{AF,j}(g_F)$ by one level according to the equation (j=max(j−1, 1)), and increases the retry counter $N_{retry}$ by one unit (that is, $N_{retry} = N_{retry} + 1$). After the step S1007, it returns to execute the step S1003.

Figure 11A:
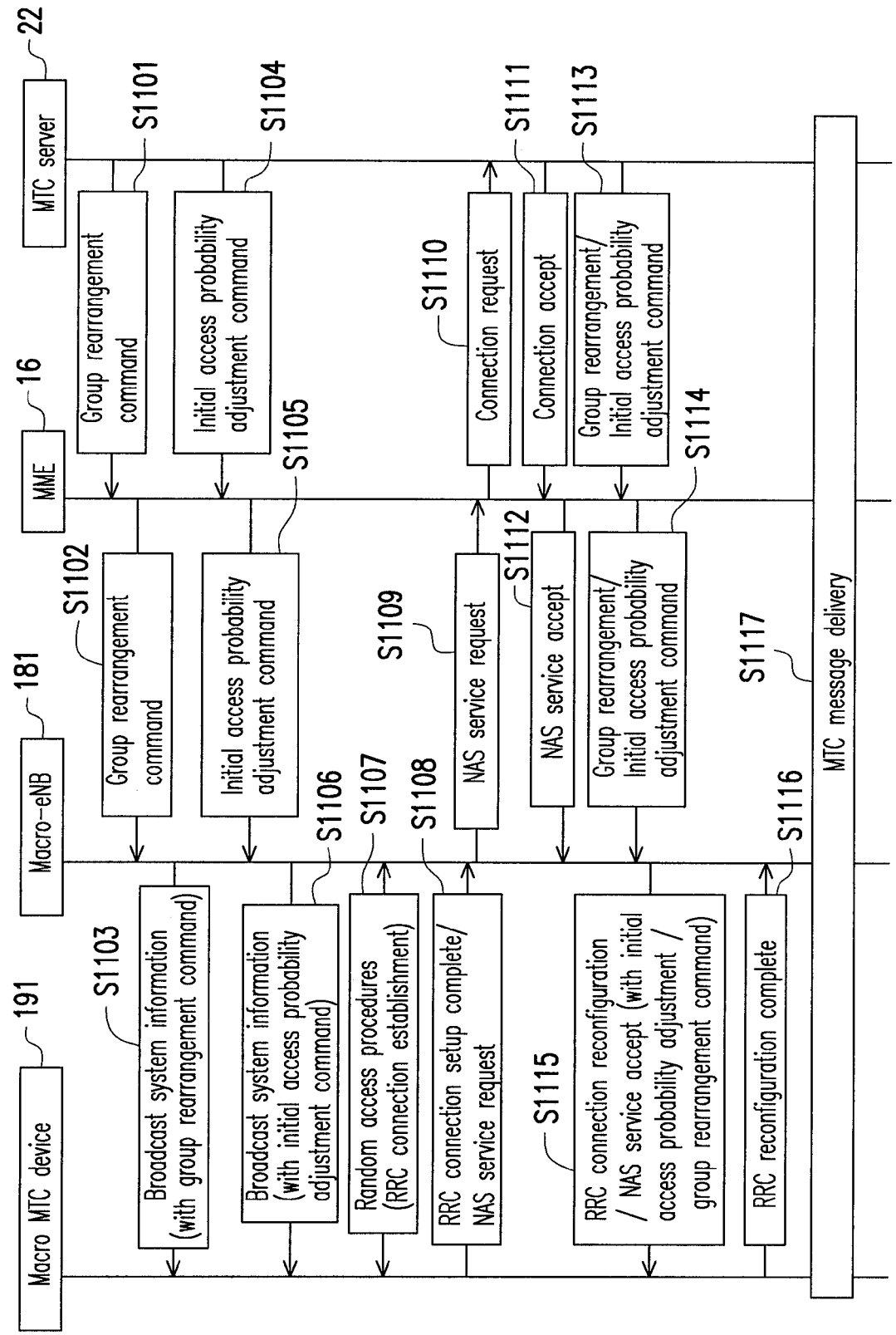
FIG. 11A is a message sequence diagram illustrating a method of group rearrangement or access probability adjustment according to an exemplary embodiment.

FIG. 11A is a message sequence diagram illustrating a method of group rearrangement or access probability adjustment according to an exemplary embodiment. The method of group rearrangement or access probability adjustment could be performed in a heterogeneous MTC network, which includes macro MTC devices, at least one macro cell base station (or macro eNBs), an MME server and an MTC server.

Referring to FIG. 11A, in step S1101, an MTC server 22 transmits a group rearrangement command to an MME 16. It is noted that, the group rearrangement command may be generated by the MTC server 22 according to the group splitting/group merging procedures illustrated FIGS. 6-8. In step S1102, the MME 16 forwards the group rearrangement command to a macro-eNB 181. In step S1103, the macro-eNB 181 broadcasts a broadcast system information (with group rearrangement command) to macro MTC devices, where a macro MTC device 191 could adjust its grouping when the group rearrangement command message rearranges the grouping of the macro MTC device 191.

Figure 11B:
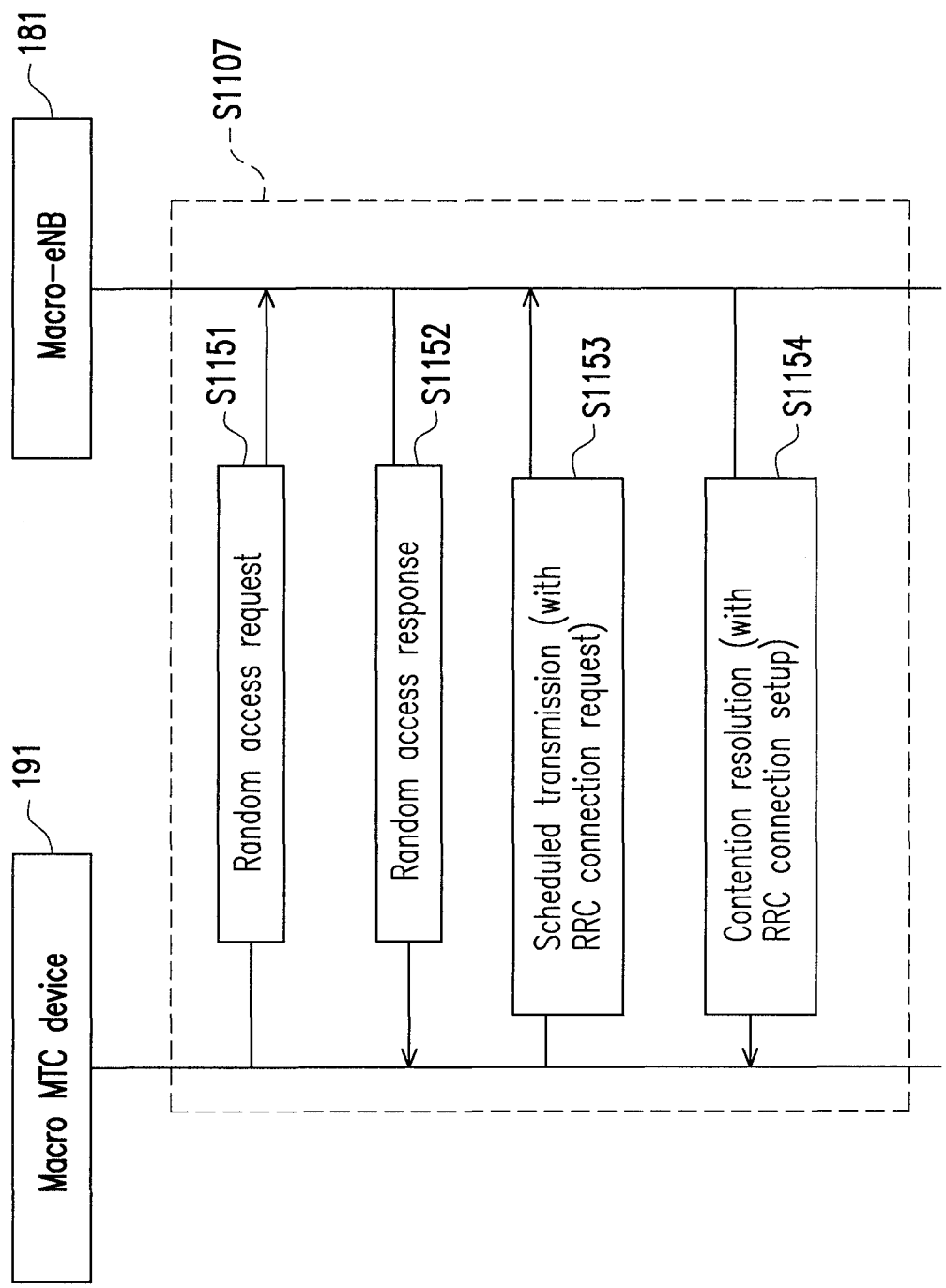
FIG. 11B is a flowchart illustrating a random access procedures according to an exemplary embodiment.

In step S1104, the MTC server 22 transmits an initial access probability adjustment command to the MME 16. It is noted that, the initial access probability adjustment command may be generated by the MTC server 22 according to decreasing access probability/increasing access probability procedures illustrated FIGS. 6-8. In step S1105, the MME 16 forwards the initial access probability adjustment command to the macro-eNB 181. In step S1106, the macro-eNB 181 broadcasts a broadcast system information (with the initial access probability adjustment command) to macro MTC devices, where the macro MTC device 191 could adjust its initial access probability when the initial access probability adjustment command modifies the initial access probability of the macro MTC device 191. In step S1107, the macro MTC device 191 and the macro-eNB 181 perform random access procedures (for RRC connection establishment), and the random access procedures will be further described in detail, as shown in FIG. 11B. The command messages in the steps S1101~S1103 and the steps S1104~S1106 are broadcast messages, so the macro-eNB 181 may have to wait for certain broadcast cycle(s) to deliver the group rearrangement message or the initial access probability adjustment command. Thus, the MTC server 22, the MME 16 and the macro-eNB 181 may execute the steps S1113~S1115 to deliver a unicast control message as a quick initial access probability adjustment command or a quick group rearrangement message.

In the step S1108, after the RRC connection is established, the macro MTC device 191 could transmit a RRC connection setup complete message or a non-access stratum (NAS) service request message to the macro-eNB 181. In step S1109, the macro-eNB 181 forwards a NAS service request message to the MME 16. In step S1110, the MME 16 transmits a connection request message to the MTC server 22. In response to the connection request message in the step S1110, the MTC server 22 replies a connection accept message to the MME 16 in the step S1111. In step S1112, the MME 16 transmits a NAS service accept message to the macro-eNB 181.

In step S1113, the MTC server 22 transmits a group rearrangement command or an initial access probability adjustment command to the MME 16. As mentioned previously, the group rearrangement or the initial access probability adjustment command in the step S1113 are used to unicast the group rearrangement command or the initial access probability adjustment command. Moreover, the group rearrangement command or the initial access probability adjustment command may be generated by the MTC server 22 according to corresponding procedures involved in increasing/decreasing access probability and splitting/merging group procedures, as illustrated in FIGS. 6-8. In the step S1114, the MME 16 forwards the group rearrangement message or the initial access probability adjustment command to the macro-eNB 181. In step S1115, the macro-eNB 181 unicasts a RRC connection reconfiguration message or a NAS service accept message (with the initial access probability adjustment command or a group rearrangement message) to the macro MTC device 191. In response to the RRC connection reconfiguration message or the NAS service accept message, the macro MTC device 191 replies a RRC reconfiguration complete message to the macro-eNB 181 in step S1116.

In the step S1117, the macro MTC device 191, the macro-eNB 181, the MME server 16, and the MTC server 22 perform an MTC message deliver process. It is noted that the MTC server 22 in the present embodiment may refer to a femto gateway, an MME server, a GGSN, or an MTC gateway. Therefore, some of the message sequence flows may be simplified when the MTC server is the MME server.

FIG. 11B is a flowchart illustrating a random access procedures according to an exemplary embodiment. FIG. 11B provides a detailed description on implementation of the step S1107 illustrated in FIG. 11A. Referring to FIG. 11B, the step S1107 includes following procedures. (1) In the step S1151, the macro MTC device 191 transmits a random access request message to the macro-eNB 181. (2) In the step S1152, the macro-eNB 181 replies a random access response message to the macro MTC device 191. (3) In the step S1153, it is a scheduled transmission by which the macro MTC device 191 transmits a RRC connection request message to the macro-eNB 181. (4) Then, in the step S1154, the macro-eNB 181 replies a RRC connection setup message as a contention resolution message to the macro MTC device 191.

Figure 12:
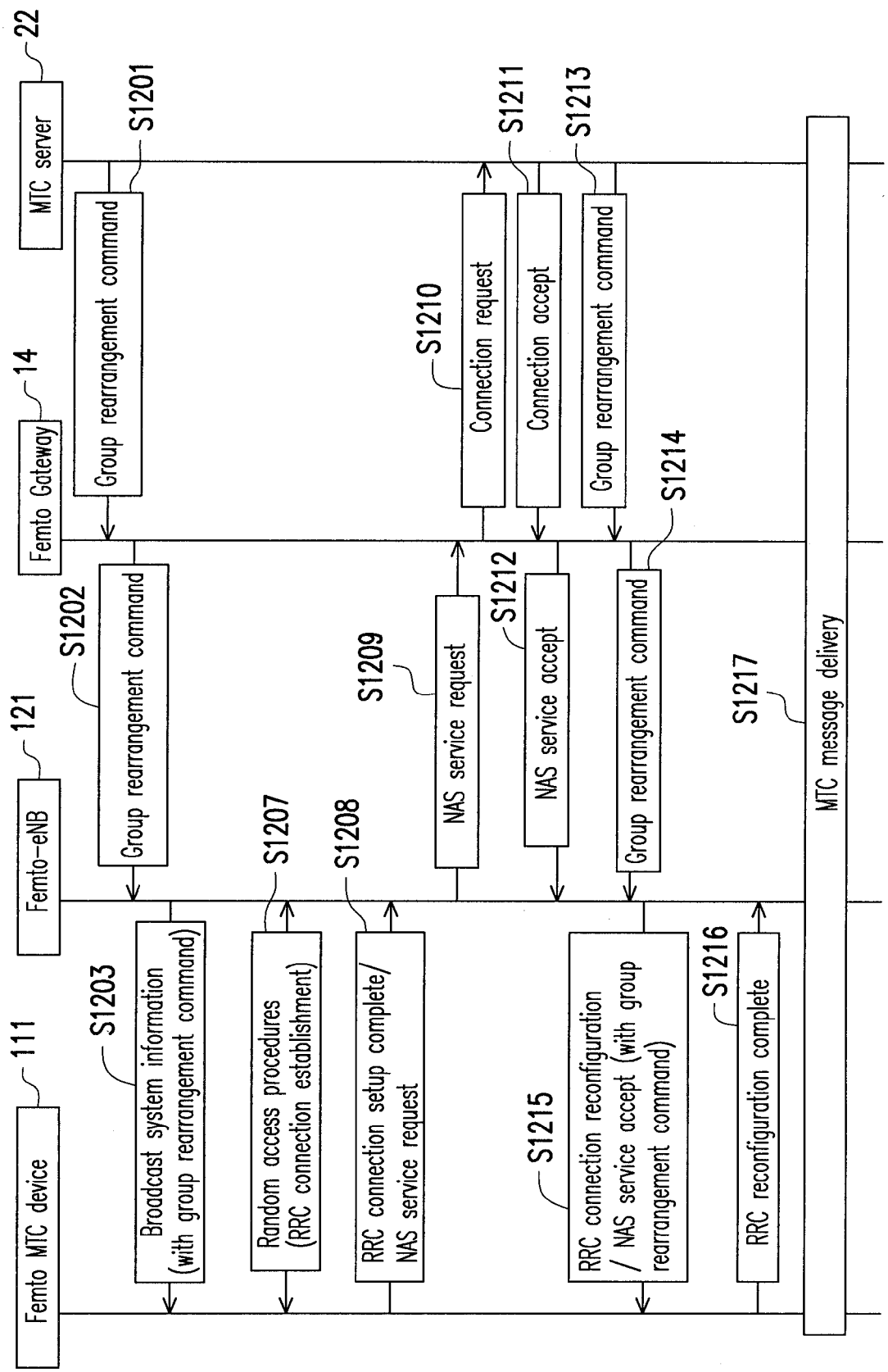
FIG. 12 is a message sequence diagram illustrating a method of group rearrangement or access probability adjustment according to another exemplary embodiment.

FIG. 12 is a message sequence diagram illustrating a method of group rearrangement according to another exemplary embodiment. The method of group rearrangement could be performed in a heterogeneous MTC network, which includes femto MTC devices, at least one femto cell base station (or femto eNBs), a femto gateway and an MTC server.

Referring to FIG. 12, in step S1201, a MTC server 22 transmits a group rearrangement command to a femto gateway 14. It is noted that, the group rearrangement command may be generated by the MTC server 22 according to the group splitting/group merging procedures illustrated FIGS. 6-8. In step S1202, the femto gateway 14 forwards the group rearrangement command to a femto-eNB 121. In step S1203, the femto-eNB 121 broadcasts a broadcast system information (with group rearrangement command) to femto MTC devices, where a femto MTC device 111 could adjust its grouping when the group rearrangement command message rearranges the grouping of the femto MTC device 111.

In step S1207, the femto MTC device 111 and the femto-eNB 121 perform random access procedures (for RRC connection establishment), and the random access procedures could be referred to FIG. 11B in detail. The command messages in the steps S1201~S1203 are broadcast messages, so the femto-eNB 121 may have to wait for certain broadcast cycle(s) to deliver the group rearrangement message. Thus, the MTC server 22, the femto gateway 14 and the femto eNB 121 may execute the steps S1213~S1215 to deliver a unicast control message as a quick group rearrangement message.

In step S1208, after the RRC connection is established, the femto MTC device 111 could transmit a RRC connection setup complete message or a non-access stratum (NAS) service request message to the femto-eNB 121. In step S1209, the femto-eNB 121 forwards a NAS service request message to the femto gateway 14. In the step S1210, the femto gateway 14 transmits a connection request message to the MTC server 22. In response to the connection request message in the step S1210, the MTC server 22 replies a connection accept message to the femto gateway 14 in the step S1211. In the step S1212, the femto gateway 14 transmits a NAS service accept message to the femto-eNB 121.

In the step S1213, the MTC server 22 transmits a group rearrangement command to the femto gateway 14. As mentioned previously, the group rearrangement command in the step S1213 is used to unicast the group rearrangement message. Furthermore, the group rearrangement message may be generated by the MTC server according to corresponding procedures involved in splitting/merging group procedures, as illustrated in FIGS. 6-8. In the step S1214, the femto gateway 14 forwards the group rearrangement message to the femto-eNB 121. In step S1215, the femto-eNB 121 unicasts a RRC connection reconfiguration message or a NAS service accept message (with a group rearrangement message) to the femto MTC device 111. In response to the RRC connection reconfiguration message or the NAS service accept message, the femto MTC device 111 replies a RRC reconfiguration complete message to the femto-eNB 121 in step S1216.

In step S1217, the femto MTC device 111, the femto-eNB 121, the femto gateway 14, and the MTC server 22 perform an MTC message deliver process. It is noted that the MTC server in the present embodiment may refer to a femto gateway, an MME server, a GGSN, or an MTC gateway. Therefore, some of the message sequence flows may be simplified when the MTC server is the femto gateway.

It is noted that, in some embodiment of the present disclosure, the access probability of femto groups may be not adjusted by the MTC server, and this may reduce signaling overhead of the femto cells. However, in other embodiments, MTC server may adjust both the access probability of femto groups and the access probability of macro groups.

Figure 13:
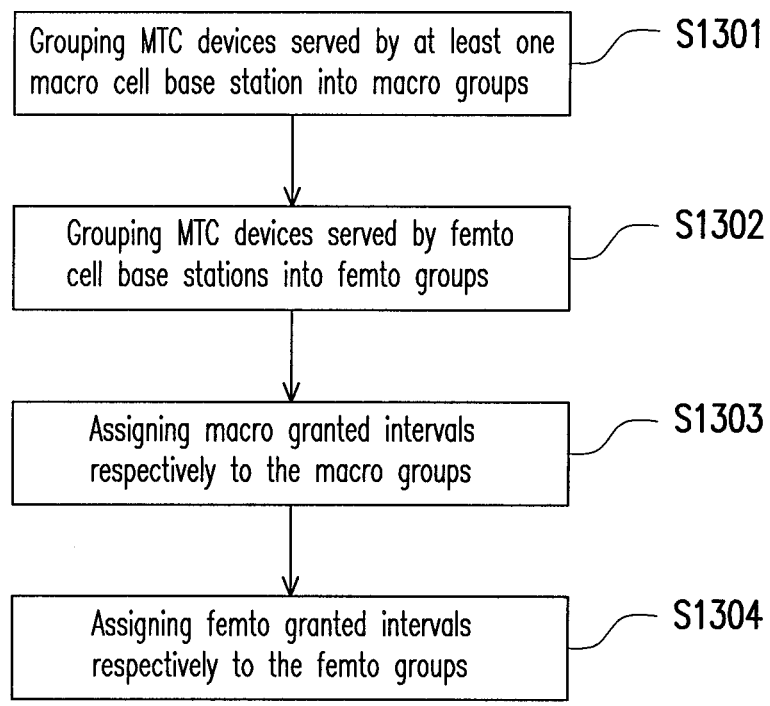
FIG. 13 is a flowchart illustrating a cell-aware adaptive group-based time control method for accessing MTC server according to an exemplary embodiment.

FIG. 13 is a flowchart illustrating a cell-aware adaptive group-based time control method for accessing MTC server according to an exemplary embodiment. Referring to FIG. 13, the proposed method is adapted to an MTC server of a heterogeneous MTC network and includes following procedures: the MTC server grouping MTC devices served by one or more macro cell base stations into macro groups (step S1301); the MTC server grouping MTC devices served by one or more femto cell base stations into femto groups (step S1302); the MTC server assigning macro granted intervals respectively to the macro groups (step S1303); and the MTC server assigning femto granted intervals respectively to the femto groups (step S1304). It is noted that macro MTC devices in one of the macro groups have the same macro granted interval, and the macro MTC devices in all macro groups have the same macro cycle time. The macro MTC devices in each of the macro groups could deliver their MTC messages to the MTC server only in their assigned macro granted intervals. Femto MTC devices in one of the femto groups have the same femto granted interval, and the femto MTC devices in all femto groups have the same femto cycle time. The femto MTC devices in each of the femto groups could deliver their MTC messages to the MTC server only in their assigned femto granted intervals.

Figure 14:
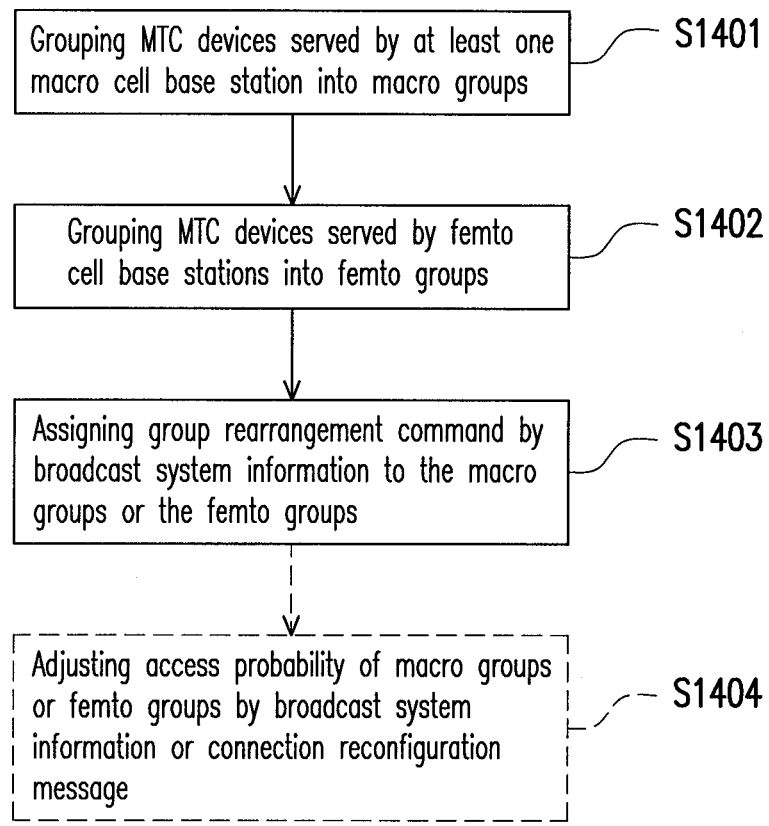
FIG. 14 is a flowchart illustrating a cell-aware adaptive group-based time control method for accessing MTC server according to an exemplary embodiment.

FIG. 14 is a flowchart illustrating a cell-aware adaptive group-based time control method for accessing MTC server according to an exemplary embodiment. Referring to FIG. 14, the proposed method is adapted to an MTC server of a heterogeneous MTC network and includes following procedures: the MTC server grouping MTC devices served by one or more macro cell base stations into macro groups (step S1401); the MTC server grouping MTC devices served by one or more femto cell base stations into femto groups (step S1402); and the MTC server assigning group arrangement command to the macro groups or the femto groups by broadcast system information (step S1403); or the MTC server optionally adjusting access probability of macro groups or femto groups by transmitting broadcast system information or connection reconfiguration message (step S1404). It is noted that the MTC devices in one of the macro groups have the same macro granted interval, and the MTC devices in all macro groups have the same macro cycle time. The MTC devices in each of the macro groups could deliver their MTC messages to the MTC server only in their macro granted interval. The MTC devices in one of the femto groups have the same femto granted interval, and the MTC devices in all femto groups have the same femto cycle time. The MTC devices in each of the femto groups could deliver their MTC messages to the MTC server only in their femto granted interval.

Figure 15:
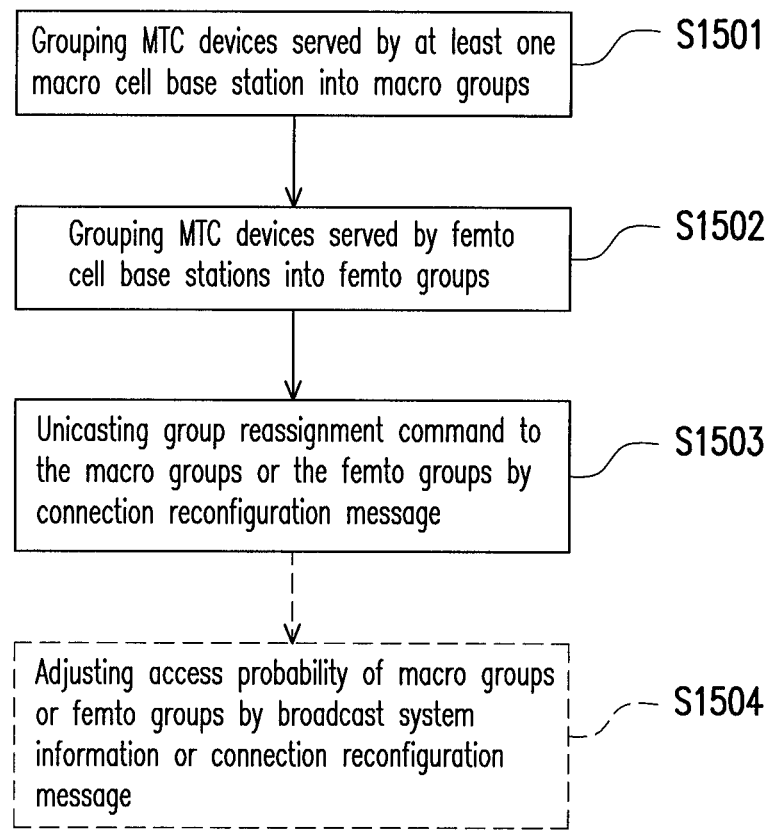
FIG. 15 is a flowchart illustrating a cell-aware adaptive group-based time control method for accessing MTC server according to an exemplary embodiment.

FIG. 15 is a flowchart illustrating a cell-aware adaptive group-based time control method for accessing MTC server according to an exemplary embodiment. Referring to FIG. 15, the proposed method is adapted to an MTC server of a heterogeneous MTC network and includes following procedures: the MTC server grouping MTC devices served by one or more macro cell base stations into macro groups (step S1501); the MTC server grouping MTC devices served by one or more femto cell base stations into femto groups (step S1502); and the MTC server assigning group rearrangement command to the macro groups or the femto groups by unicasting the connection reconfiguration message (step S1503); or the MTC server optionally adjusting access probability of macro groups or femto groups by transmitting broadcast system information or connection reconfiguration message (step S1504). It is noted that the MTC devices in one of the macro groups have the same macro granted interval, and the MTC devices in all macro groups have the same macro cycle time. The MTC devices in each of the macro groups could deliver their MTC messages to the MTC server only in their macro granted interval. The MTC devices in one of the femto groups have the same femto granted interval, and the MTC devices in all femto groups have the same femto cycle time. The MTC devices in each of the femto groups could deliver their MTC messages to the MTC server only in their femto granted interval.

Figure 16:
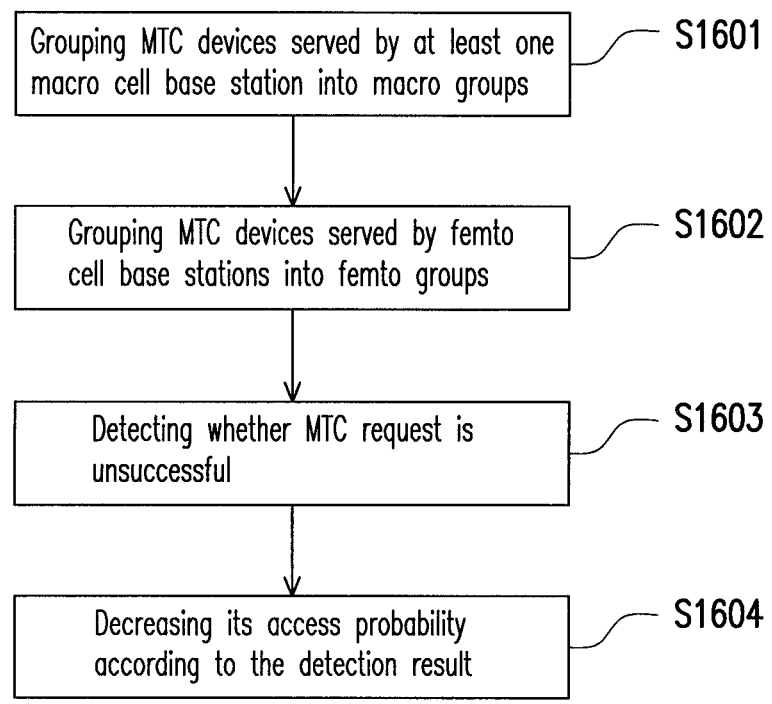
FIG. 16 is a flowchart illustrating a cell-aware adaptive group-based time control method for accessing MTC server according to an exemplary embodiment.

FIG. 16 is a flowchart illustrating a cell-aware adaptive group-based time control method for accessing MTC server according to an exemplary embodiment. Referring to FIG. 16, the proposed method could be adapted to an MTC device (for example, a macro MTC device or a femto MTC device) in a heterogeneous MTC network, and includes following procedures: the MTC server grouping MTC devices served by one or more macro cell base stations into macro groups (step S1601); the MTC server grouping MTC devices served by one or more femto cell base stations into femto groups (step S1602); the MTC device detecting whether its MTC message delivery is unsuccessful, and generating a detection result (step S1603); and the MTC device decreasing its access probability according to the detection result (step S1604).

It is noted that, in the present embodiment, the MTC devices in one of the macro groups have the same macro granted interval, and the MTC devices in all macro groups have the same macro cycle time. The MTC devices in each of the macro groups could deliver their MTC messages to the MTC server only in their macro granted interval. The MTC devices in one of the femto groups have the same femto granted interval, and the MTC devices in all femto groups have the same femto cycle time. The MTC devices in each of the femto groups could deliver their MTC messages to the MTC server only in their femto granted interval.

Figure 17:
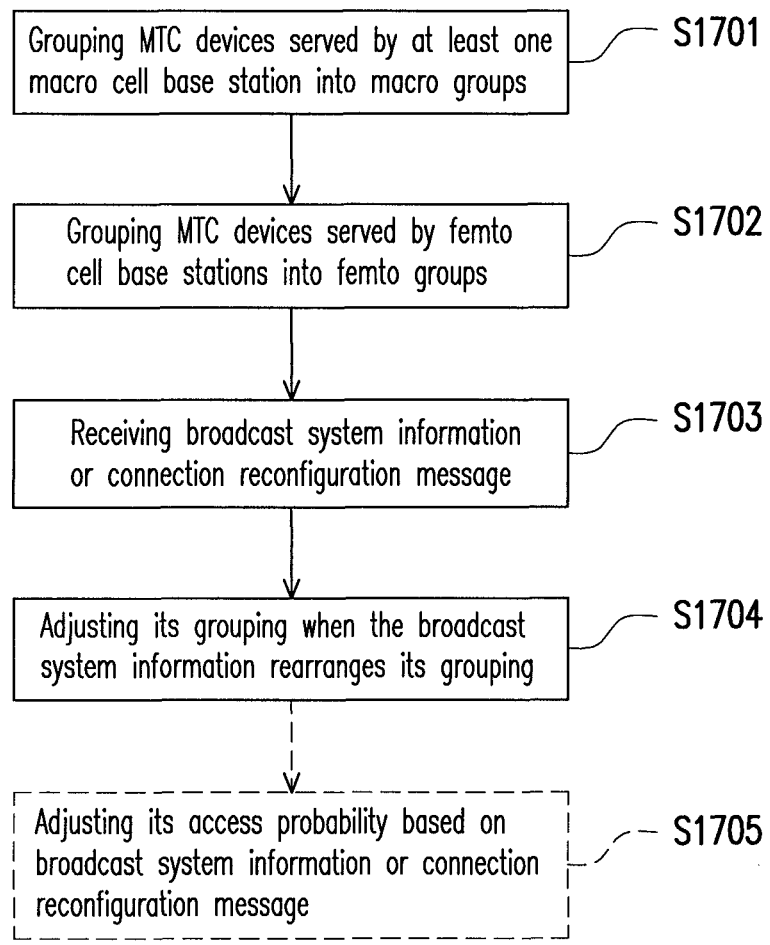
FIG. 17 is a flowchart illustrating a cell-aware adaptive group-based time control method for accessing MTC server according to an exemplary embodiment.

FIG. 17 is a flowchart illustrating a cell-aware adaptive group-based time control method for accessing MTC server according to an exemplary embodiment. Referring to FIG. 17, the proposed method could be adapted to an MTC device (for example, a macro MTC device or a femto MTC device) in a heterogeneous MTC network, and includes following procedures: the MTC server grouping MTC devices served by one or more macro cell base stations into macro groups (step S1701); the MTC server grouping MTC devices served by one or more femto cell base stations into femto groups (step S1702); the MTC device receiving broadcast system information or connection reconfiguration message (step S1703); and the MTC device adjusting its grouping when the broadcast system information rearranges grouping of the MTC device (step S1704); or after the MTC device receives broadcast system information or connection reconfiguration message, which contains an access probability adjustment command, the MTC device adjusting its access probability when the broadcast system information or connection reconfiguration message adjusts access probability of the MTC device (step S1705).

It is noted that, in the present embodiment, the MTC devices in one of the macro groups have the same macro granted interval, and the MTC devices in all macro groups have the same macro cycle time. The MTC devices in each of the macro groups could deliver their MTC messages to the MTC server only in their macro granted interval. The MTC devices in one of the femto groups have the same femto granted interval, and the MTC devices in all femto groups have the same femto cycle time. The MTC devices in each of the femto groups could deliver their MTC messages to the MTC server only in their femto granted interval.

Figure 18:
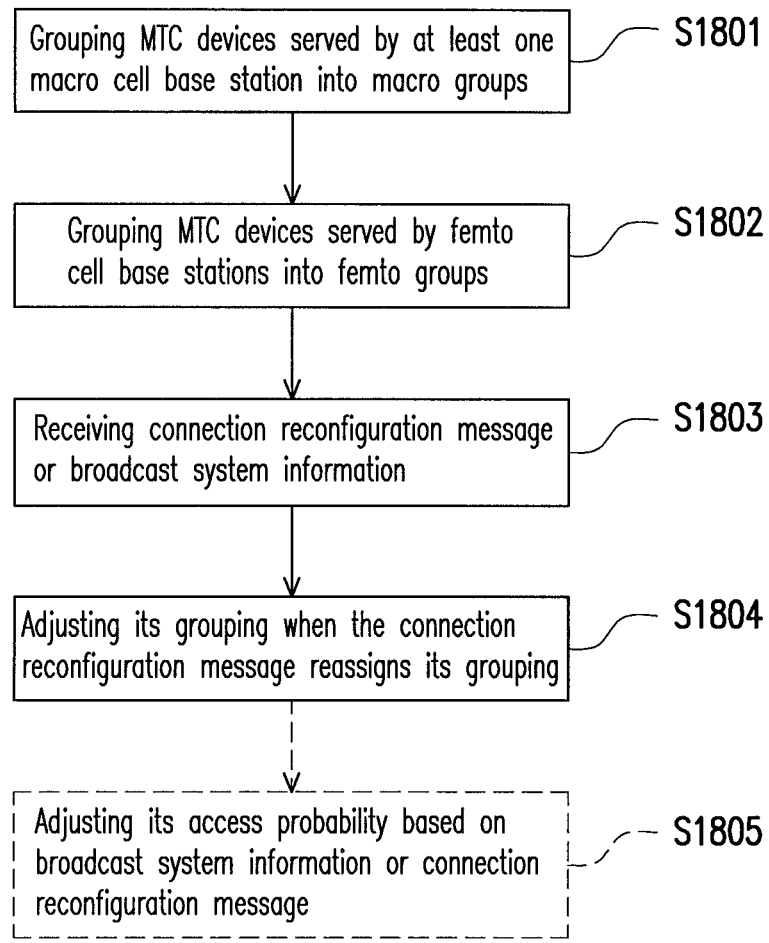
FIG. 18 is a flowchart illustrating a cell-aware adaptive group-based time control method for accessing MTC server according to an exemplary embodiment.

FIG. 18 is a flowchart illustrating a cell-aware adaptive group-based time control method for accessing MTC server according to an exemplary embodiment. Referring to FIG. 18, the proposed method could be adapted to an MTC device (for example, a macro MTC device or a femto MTC device) in a heterogeneous MTC network, and includes following procedures: the MTC server grouping MTC devices served by one or more macro cell base stations into macro groups (step S1801); the MTC server grouping MTC devices served by one or more femto cell base stations into femto groups (step S1802); the MTC device receiving connection reconfiguration message or broadcast system information (step S1803); and the MTC device adjusting its grouping when the connection reconfiguration message rearranges the grouping of the MTC device (step S1804); or after the MTC device receives broadcast system information or connection reconfiguration message, which contains an access probability adjustment command, the MTC device adjusting its access probability when the broadcast system information or connection reconfiguration message adjusts access probability of the MTC device (step S1805).

It is noted that, in the present embodiment, the MTC devices in one of the macro groups have the same macro granted interval, and the MTC devices in all macro groups have the same macro cycle time. The MTC devices in each of the macro groups could deliver their MTC messages to the MTC server only in their macro granted interval. The MTC devices in one of the femto groups have the same femto granted interval, and the MTC devices in all femto groups have the same femto cycle time. The MTC devices in each of the femto groups could deliver their MTC messages to the MTC server only in their femto granted interval.

In summary, according to the exemplary embodiments of the disclosure, cell-aware adaptive group-based time control methods for accessing MTC server are proposed, and the cell-aware adaptive group-based time control method may be applied to heterogeneous MTC networks including femto MTC devices and macro MTC devices. Femto MTC devices are grouped into femto groups and macro MTC devices are grouped into macro groups, where each of the assigned groups has its granted interval for delivering MTC messages. In addition, the proposed method statistically counts consecutively accumulated number of occurrence of core network (CN) overload of each group or the accumulated number of occurrence of unsuccessful access request attempts of each device, and adjusts the group numbers, cycle time, and access probability of the macro devices or the femto devices according to the accumulated number of occurrence of CN overload or the accumulated number of occurrence of unsuccessful access request attempts. Further, the macro groups or the femto groups are selected to be merged or split according to the accumulated number of occurrence of CN overload.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for grouping machine type communication (MTC) devices in heterogeneous networks, the method comprising:
grouping MTC devices by a control node into macro groups and femto groups, wherein the MTC devices served by at least one macro cell base station are grouped into macro groups, and the MTC devices served by at least one femto cell base station are grouped into femto groups;
assigning a macro granted interval respectively to each of the macro groups, wherein the MTC devices in a macro group transmit MTC data to the MTC server in the assigned macro granted interval of the macro group, and the macro granted intervals of different macro groups are not overlapped;
assigning a femto granted interval respectively to each of the femto groups, wherein the MTC devices in a femto group transmit MTC data to the MTC server in the assigned femto granted interval of the femto group, and the femto granted intervals of different femto groups are not overlapped;
detecting by a control node in each assigned granted interval of the macro group and the femto group whether network overload occurs to obtain a detection result after receiving data;
determining by the control node whether to adjust an access probability of the macro group or the femto group according to the detection result;
determining whether the detection result indicates that the macro group in the assigned macro granted interval consecutively suffers from network overload, when the detection result indicates that the network overload occurs consecutively, controlling the access of the macro group in the macro granted interval by adjusting the access probability of the associated macro group by the control node; and
determining whether the detection result indicates that the femto group in the assigned femto granted interval consecutively suffers from network overload, when the detection result indicates that the network overload occurs consecutively, controlling the access of the femto group in the femto granted interval by adjusting the access probability of the associated femto group by the control node.

2. The method of claim 1 further comprising:
determining by the control node whether to reform a macro group or a femto group by splitting or combining according to the detection result.

3. The method of claim 2, further comprising:
if the control node determines to adjust a macro group or a femto group,
transmitting a group rearrangement message to all the macro groups or all the femto groups.

4. The method of claim 3, further comprising:
transmitting the group rearrangement message to a new macro MTC device in the macro group or a new femto MTC device in the femto group, wherein the new macro or femto MTC device has attached to the macro cell base station or the femto cell base station.

5. The method of claim 2, wherein the steps of determining by the control node whether to adjust an access probability of the macro group or the femto group, or to reform a macro group or a femto group by splitting or combining according to the detection result comprises:
when the detection result indicating a value of a second overload counter, representing a number of cycles that the network overload does not occur consecutively, is equal to or greater than a first increasing threshold and less than a second increasing threshold, every time the network overload does not occur consecutively for a predefined cycle times, the control node increasing the access probability of the associated macro group or the associated femto group.

6. The method of claim 5, further comprising:
when both the value of the second overload counter and the value of a fourth overload counter is equal to or greater than the second increasing threshold and the average MTC message load is less than a preconfigured MTC message load upper limit, the control node selecting and merging the associated macro group with another smaller group among the macro groups; or merging the associated femto group with another smaller group among the femto groups.

7. The method of claim 5, further comprising:
when the macro group is configured with a preconfigured minimum access probability and the value of the second overload counter is equal to or greater than a third increasing threshold which is greater than the second increasing threshold, the control node then assigning a preconfigured macro group access probability to the associated macro group; and when the femto group is configured with the preconfigured minimum access probability and the value of the fourth overload counter is equal to or greater than the third increasing threshold, the control node then assigning a preconfigured femto group access probability to the associated femto group, wherein both the preconfigured macro group access probability and the preconfigured femto group access probability are greater than the preconfigured minimum access probability.

8. The method of claim 1, further comprising:
if the control node determines to adjust an access probability of the macro group or the femto group according to the detection result,
transmitting an access probability adjustment command to the macro group or the femto group.

9. The method of claim 8, further comprising:
transmitting the access probability adjustment command to a new macro MTC device in the macro group or a new femto MTC device in the femto group, wherein the new macro or femto MTC device has attached to its serving base station.

10. The method of claim 1, further comprising:
determining that the network overload occurs for a predefined cycle times when the detection result indicating a value of a first overload counter, representing a number of cycles that the network overload consecutively occurs, is equal to or greater than a first decreasing threshold and less than a second decreasing threshold, and the value of a third overload counter is less than the second decreasing threshold, every time the network overload occurs consecutively for a predefined cycle times, the control note decreasing the access probability of the associated macro group or of the associated femto group.

11. The method of claim 10, further comprising:
when the value of the first overload counter or the value of the third overload counter is equal to or greater than the second decreasing threshold, the control node adjusts the associated macro group and the femto group.

12. The method of claim 10, further comprising:
when the detection result indicating the value of the first overload counter or the value of the third overload counter is equal to a third decreasing threshold, the control node assigning a preconfigured minimum access probability to the associated macro group and femto group, wherein the third decreasing, threshold is greater than the second decreasing threshold.

13. A method for grouping MTC devices in heterogeneous MTC networks, the method comprising:
grouping the MTC devices by a control node into macro groups and femto groups, wherein the MTC devices served by at least one macro cell base station are grouped into macro groups and the MTC devices in a macro group transmit data to a MTC server in an assigned macro granted interval, and the MTC devices served by at least one femto cell base station are grouped into femto groups and the MTC devices in a femto group transmit data to the MTC server in an assigned femto granted interval, wherein the macro granted intervals of different macro groups are not overlapped and the femto granted intervals of different femto groups are not overlapped;
detecting by the control node in each assigned granted interval of the macro group and the femto group whether network overload occurs to obtain a detection result after receiving data;
determining by the control node whether to adjust an access probability of the macro group or the femto group according to the detection result;
determining whether the detection result indicates that the macro group in the assigned macro granted interval consecutively suffers from network overload, when the detection result indicates that the network overload occurs consecutively, controlling the access of the macro group in the macro granted interval by adjusting the access probability of the associated macro group by the control node; and
determining whether the detection result indicates that the femto group in the assigned femto granted interval consecutively suffers from network overload, when the detection result indicates that the network overload occurs consecutively, controlling the access of the femto group in the femto granted interval by adjusting the access probability of the associated femto group by the control node.

14. The method of claim 13, wherein after the step of determining by the control node whether the detection result indicates that the macro group in the assigned macro granted interval or the femto group in the assigned femto granted interval consecutively suffers from network overload, and when the detection result indicates that the network overload occurs consecutively, the method further comprising:
transmitting by the control node a group rearrangement command to each macro group or to each femto group by transmitting a system information.

15. The method of claim 14, wherein the step of assigning by the control node the group rearrangement command to each macro group or to each femto group by transmitting the system information comprises:
transmitting by the control node one group rearrangement command to all of the macro group or all of the femto group.

16. The method of claim 14, further comprising:
transmitting by the control node an access probability adjustment command to the macro group or to the femto group.

17. The method of claim 14, further comprising:
transmitting by the control node an access probability adjustment command to a newly-connected MTC device in the macro group or in the femto group after the newly-connected MTC device has attached to its serving cell base station.

18. The method of claim 14, wherein before the step of assigning by the control node a group rearrangement command to each macro group or to each femto group by transmitting the system information, the method further comprises:
detecting by the control node network overload after receiving data to produce a detection result; and
determining parameters according to the detection result to reform the macro group or the femto group, or to adjust an access probability of macro group or femto group.

19. The method of claim 13, further comprising:
transmitting by the control node a group rearrangement command to a newly-connected MTC device in the macro group or in the femto group by transmitting a connection reconfiguration message.

20. The method of claim 19, wherein the step of transmitting a group rearrangement command to the newly-connected MTC device in the macro group or in the femto group by transmitting the connection reconfiguration message comprises:
transmitting a group rearrangement command to the newly-connected MTC device in the macro group or in the femto group by using a connection reconfiguration message.

21. The method of claim 19, further comprising:
transmitting an access probability adjustment command to the macro group or to the femto group.

22. The method of claim 19, further comprising:
transmitting an access probability adjustment command to the newly-connected MTC device in the macro group or in the femto group after the newly-connected MTC device has attached to its serving cell base station.

23. The method of claim 19, wherein before the step of transmitting the group rearrangement command to the newly-connected MTC device in the macro group or in the femto group by transmitting the connection reconfiguration message, the method further comprises:
detecting network overload after receiving data to produce a detection result; and
determining from the detection result to reform the macro group or the femto group, or to adjust an access probability of macro group or femto group.

24. A communication method, adapted to a machine type communication (MTC) device in a heterogeneous MTC network comprising a plurality of MTC devices, the method comprises:
grouping the plurality of MTC devices served by at least one macro cell base station into macro groups and grouping the plurality of MTC devices served by at least one femto cell base station into femto groups, wherein the plurality of MTC devices in a macro group transmit data to the MTC server in an assigned macro granted interval, and the plurality of MTC devices in a femto group transmit data to the MTC server in an assigned femto granted interval, wherein the macro granted intervals of different macro groups are not overlapped and the femto granted intervals of different femto groups are not overlapped;

receiving by one of the plurality of MTC devices a system information containing a group rearrangement command;

adjusting its own group assignment by the one of the plurality of MTC devices according to the group rearrangement command;

receiving by the one of the plurality of MTC devices another system information containing an access probability adjustment command;

adjusting its own access probability by the one of the plurality of MTC devices according to the another system information, where the access probability adjustment command configures the access probability, which is associated with a detection result detected by a control node in each assigned granted interval of the macro group and the femto group whether network overload occurs, wherein the method comprises:

determining whether the detection result indicates that the macro group in the assigned macro granted interval consecutively suffers from network overload, when the detection result indicates that the network overload occurs consecutively, controlling the access of the macro group in the macro granted interval by adjusting the access probability of the associated macro group by the control node; and determining whether the detection result indicates that the femto group in the assigned femto granted interval consecutively suffers from network overload, when the detection result indicates that the network overload occurs consecutively, controlling the access of the femto group in the femto granted interval by adjusting the access probability of the associated femto group by the control node.

25. The method of claim 24, further comprising:

receiving by the one of the plurality of MTC devices a connection reconfiguration message containing another group rearrangement commend from a base station serving the MTC after the one of the plurality of MTC devices has attached to the base station; and adjusting its own group assignment by the one of the plurality of MTC devices according to the another group rearrangement command.

26. The method of claim 24, further comprising:

receiving by the one of the plurality of MTC devices another connection reconfiguration message, containing another access probability adjustment command from a base station which serves the one of the plurality of MTC devices after the one of the plurality of MTC devices has attached to the base station; and adjusting its access probability by the one of the plurality of MTC devices according to the another connection reconfiguration message, wherein the another access probability adjustment command configures its access probability.

27. A communication method, adapted to a machine type communication (MTC) device in a heterogeneous MTC network comprising a plurality of MTC devices, the method comprises:

grouping the plurality of MTC devices served by at least one macro cell base station into macro groups and grouping the plurality of MTC devices served by at least one femto cell base station into femto groups, wherein the plurality of MTC devices in a macro group transmit data to the MTC server in an assigned macro granted interval, and the plurality of MTC devices in a femto group transmit data to the MTC server in an assigned femto granted interval, wherein the macro granted intervals of different macro groups are not overlapped and the femto granted intervals of different femto groups are not overlapped;

receiving by one of the plurality of MTC devices a connection reconfiguration message containing a group rearrangement command;

adjusting its own group assignment by the one of the plurality of MTC devices according to the group rearrangement command;

receiving by the one of the plurality of MTC devices another connection reconfiguration message containing an access probability adjustment command from a base station which serves the one of the plurality of MTC devices after the one of the plurality of MTC devices has attached to the base station;

adjusting its own access probability by the one of the plurality of MTC devices according to the another connection reconfiguration message wherein the access probability adjustment command configures the access probability of the one of the plurality of MTC devices, which is associated with a detection result detected by a control node in each assigned granted interval of the macro group and the femto group whether network overload occurs, wherein the method comprises:

determining whether the detection result indicates that the macro group in the assigned macro granted interval consecutively suffers from network overload, when the detection result indicates that the network overload occurs consecutively, controlling the access of the macro group in the macro granted interval by adjusting the access probability of the associated macro group by the control node; and determining whether the detection result indicates that the femto group in the assigned femto granted interval consecutively suffers from network overload, when the detection result indicates that the network overload occurs consecutively, controlling the access of the femto group in the femto granted interval by adjusting the access probability of the associated femto group by the control node.

28. A method for grouping machine type communication (MTC) devices in a network, the method comprising:

grouping MTC devices by a control node into MTC groups which comprise macro groups and femto groups according to a base station type which serves the MTC devices, wherein the MTC devices in a macro group transmit data to the MTC server in an assigned macro granted interval, and the MTC devices in a femto group transmit data to the MTC server in an assigned femto granted interval, wherein the macro granted intervals of different macro groups are not overlapped and the femto granted intervals of different femto groups are not overlapped;

transmitting an indication by the control node to the base station for adjusting radio communication of the network;

detecting by the control node in each assigned granted interval of the macro group and the femto group whether network overload occurs to obtain a detection result after receiving data;

determining by the control node whether to adjust an access probability of the macro group or the femto group according to the detection result;

determining whether the detection result indicates that the macro group in the assigned macro granted interval consecutively suffers from network overload, when the detection result indicates that the network overload occurs consecutively, controlling the access of the macro group in the macro granted interval by adjusting the access probability of the associated macro group by the control node; and determining whether the detection result indicates that the femto group in the assigned femto granted interval consecutively suffers from network overload, when the detection result indicates that the network overload occurs consecutively, controlling the access of the femto group in the femto granted interval by adjusting the access probability of the associated femto group by the control node.

29. The method of claim 28 wherein the step of transmitting an indication by the control node to the base station for adjusting radio communication of the network comprises:

transmitting by the control node to the base station the indication containing information for controlling overload of the network.

30. The method of claim 29, wherein the information comprises at least one of a granted interval, an access probability, and a group rearrangement command per each base station group.

31. A method for grouping machine type communication (MTC) devices in heterogeneous MTC networks, the method comprising:

grouping MTC devices by a control node into macro groups and femto groups, wherein the MTC devices served by at least one macro cell base station are grouped into macro groups, and the MTC devices served by at least one femto cell base station are grouped into femto groups;

detecting network overload in an assigned granted interval to generate a message by one of the MTC devices after the one of the MTC devices sends data in the granted interval assigned to the group which the one of the MTC devices belongs to, wherein the macro granted intervals of different macro groups are not overlapped and the femto granted intervals of different femto groups are not overlapped;

transmitting the message by the one of the MTC devices to a control node;

determining by the control node whether network overload occurs in the assigned granted interval to obtain a detection result according to the message transmitted by the one of the MTC devices;

determining by the control node whether to adjust an access probability of the macro group or the femto group according to the detection result;

determining whether the detection result indicates that the macro group in the granted interval consecutively suffers from network overload, when the detection result indicates that the network overload occurs consecutively, controlling the access of the macro group in the granted interval by adjusting the access probability of the associated macro group by the control node;

determining whether the detection result indicates that the femto group in the granted interval consecutively suffers from network overload, when the detection result indicates that the network overload occurs consecutively, controlling the access of the femto group in the granted interval by adjusting the access probability of the associated femto group by the control node; and receiving from the control node an access probability adjustment command by the one of the MTC devices.

32. The method of claim 31 further comprising:

transmitting from the control node to a base station an indication for controlling overload if a network overlord is detected.

33. The method of claim 32, wherein the indication comprises either an access probability or a delay.

* * * * *